(12) United States Patent
De Somere et al.

(10) Patent No.: US 11,488,357 B2
(45) Date of Patent: Nov. 1, 2022

(54) AUTOMATED TRIMMING OF A SURFACE MESH

(71) Applicant: MEDICIM NV, Mechelen (BE)

(72) Inventors: Mathias De Somere, Mechelen (BE); Dirk Abbeloos, Mechelen (BE); Pieter Van Leemput, Rumst (BE); Wouter Mollemans, Berehem (BE)

(73) Assignee: Medicim NV, Mechelen (BE)

( * ) Notice: Subject to any disclaimer, the term of this patent is extended or adjusted under 35 U.S.C. 154(b) by 0 days.

(21) Appl. No.: 17/309,693

(22) PCT Filed: Dec. 19, 2019

(86) PCT No.: PCT/EP2019/086159
§ 371 (c)(1),
(2) Date: Jun. 15, 2021

(87) PCT Pub. No.: WO2020/127632
PCT Pub. Date: Jun. 25, 2020

(65) Prior Publication Data
US 2022/0036653 A1 Feb. 3, 2022

(30) Foreign Application Priority Data
Dec. 20, 2018 (EP) ..................................... 18214500

(51) Int. Cl.
*G06T 17/20* (2006.01)
*G06T 19/20* (2011.01)

(52) U.S. Cl.
CPC .............. *G06T 17/20* (2013.01); *G06T 19/20* (2013.01)

(58) Field of Classification Search
None
See application file for complete search history.

(56) References Cited

U.S. PATENT DOCUMENTS

| | | |
|---|---|---|
| 7,792,341 B2 | 9/2010 | Schutyser |
| 8,428,315 B2 | 4/2013 | Suetens et al. |
| 8,824,764 B2 | 9/2014 | Mollemans et al. |
| 9,439,608 B2 | 9/2016 | Schutyser et al. |
| 2013/0300734 A1 | 11/2013 | Schmidt |
| 2018/0075606 A1 | 3/2018 | Van Leemput |
| 2019/0147666 A1 | 5/2019 | Keustermans et al. |
| 2020/0170760 A1 | 6/2020 | Dawood |
| 2021/0209764 A1 | 7/2021 | Goris et al. |

OTHER PUBLICATIONS

Bose, B., "Detecting Open Surfaces in Three Dimensions", retrieved from internet: http://citeseerx.ist.psu.edu/viewdoc/download?doi=10.1.1.156.842&rep=rep1&type=pdf, Jun. 2008, 104 pages.
International Search Report dated Feb. 7, 2020 in Application No. PCT/EP2019/086159 in 4 pages.

*Primary Examiner* — Nicholas R Wilson
(74) *Attorney, Agent, or Firm* — Knobbe, Martens, Olson & Bear, LLP

(57) ABSTRACT

The present invention provides a method for automating the trimming of the boundary region of a three dimensional (3D) open surface mesh model comprising an inner mesh region delineated by boundary vertices and edges. In a particular embodiment, the present invention relates to a method for automating the trimming of an open surface mesh representing an intraoral region.

26 Claims, 9 Drawing Sheets

AUTOMATED TRIMMING OF A SURFACE MESH

CROSS-REFERENCE TO RELATED APPLICATIONS

This application is a national stage application under 35 U.S.C. § 371 of International Application No. PCT/EP2019/086159, filed on Dec. 19, 2019, which published in English as WO 2020/127632 A1 on Jun. 25, 2020 and which claims priority benefit of EP Patent Application No. 18214500.3 filed on Dec. 20, 2018.

TECHNICAL FIELD

The present invention relates to a method for automating the trimming of the boundary region of a three dimensional (3D) open surface mesh model comprising an inner mesh region delineated by boundary vertices and edges. In a particular embodiment, the present invention relates to a method for automating the trimming of an open surface mesh representing an intraoral region.

BACKGROUND

The use of 3D models of real-world objects is becoming common place in many different applications, including engineering, entertainment, law enforcement and medical applications. These 3D models are typically constructed from data collected using a 3D scanning device. Different types of 3D scanning devices are used and can be categorized depending on the technology used for capturing the 3D data. Each technology comes with its own limitations and advantages. Optical 3D scanning devices are limited by their field of view, 3D data are only collected of the surfaces of an object that can be brought within the field of view of the scanning device. Furthermore, acquiring a 3D model of an object or part thereof typically requires capturing multiple scans from many different directions to gather data on different sides of the object. These scans are registered with respect to one another and merged into a single dataset. 3D scanning devices generally register 3D surface data as a point cloud, which is, depending on the further use of the 3D data, transformed into a model, such as a structured point cloud, a polygon mesh model, a NURBS surface model or an editable feature-based CAD model. A polygon surface mesh model comprises a collection of vertices, edges and faces that define the shape of a polyhedral surface.

When only a part of an object is scanned, either because no 3D model of the entire object is needed or because certain parts of the object cannot be adequately brought within the field of view of the 3D scanning equipment, an open surface mesh model is obtained comprising an inner mesh region delineated by boundary vertices and edges. Often the boundary of such open surface mesh is irregular or jagged, for instance because of incomplete scanning within the boundary region.

Particular examples of open surface mesh models are surface representations of the intraoral cavity, including representations of the dental arch as obtained using 3D intraoral scanners (IOS). The use of such intraoral scanners is gaining popularity as an alternative for analogue impressions of the dental arch as their use proves to be time-saving and causes less inconvenience to the patient. Furthermore, the surface model of a patient's dentition obtained with an intraoral scanner is immediately available for use in treatment planning, for instance by merging this surface model with a CBCT scan of the maxillofacial area of the same patient. In contrast, an analogue impression needs to be sent to a laboratory where it is prepared for 3D scanning. However, the boundary area of an intraoral surface mesh model, typically a triangular mesh model resulting from the intraoral scanning, often comprises regions that hold no relevant or incorrect information and which need to be removed. These spurious scan regions are referred to as flap regions, which may be artefactual data or represent parts of a patient's lip, cheek, tongue or retromolar area. Furthermore, the boundary of the intraoral scan surface mesh is typically jagged, which is not visually pleasing and may complicate further processing of the intraoral surface model. FIG. 1 shows an intraoral scan model with a jagged boundary and large flap regions. To remove these flap regions and to somewhat smoothen the boundary, presently available intraoral scanning software applications provide the user the possibility to manually trim the boundary region of the intraoral surface model by indicating on said model a cut-off line for trimming. This is time consuming and manual trimming does not allow obtaining satisfactory smoothening of the surface mesh boundary. Therefore, there is a need for automatic trimming of the outer region of open surface meshes, including intraoral surface models, resulting in the removal of flap regions and warranting a smooth boundary without modifying or adding artificial surface area to the mesh models.

Bose, 2009 describes a level set method for detecting open surfaces embedded in three-dimensional volumes.

SUMMARY

To meet or at least partially meet the above-mentioned goals, methods, systems, and computer programs according to the invention are defined in the independent claims. Particular embodiments are defined in the dependent claims.

In one embodiment, a method is implemented, i.e. carried out, by a computer, or by a set of computers, which comprises receiving an open surface mesh, which may be received as data from a 3D scanning system or as an electronic file comprising the open surface mesh data. The method further comprises determining a region of said open surface mesh to be maintained after trimming and eventually trimming the open surface mesh by removing from said mesh the region or regions outside said region to be maintained. Determining said region to be maintained may comprise the steps of:
  computing function values for a plurality of positions on said open surface mesh wherein said function values gradually vary over said mesh, preferably in relation to a measure indicative of a local surface mesh property, and
  identifying an open surface mesh region to be maintained after trimming wherein said region groups mesh positions with function values within a selected range.

More preferably determining said region to be maintained comprises the steps of:
  computing function values for a plurality of positions on said open surface mesh wherein said function values gradually vary over said mesh, preferably in relation to a measure indicative of a local surface mesh property,
  calculating one or more isolines from said function values, such isoline joining surface mesh positions with the same function value,
  selecting an isoline enclosing a region of interest of said open surface mesh, using said selected isoline for defining a cut-off line enclosing the surface mesh region to be maintained after trimming.

Preferably, the method according to the present invention is executed in an automatic manner minimizing user interaction.

The invention further relates, in one embodiment, to a system for automatically trimming an open surface mesh. The system comprises a processing unit configured for carrying out the operations of the above-described method.

The invention also relates to computer programs, computer program products and storage mediums comprising computer-readable instructions configured, when executed on a computer, to cause the computer to carry out the above-described method, or to implement the functions of a system as described above.

DETAILED DESCRIPTION

Figure 1:
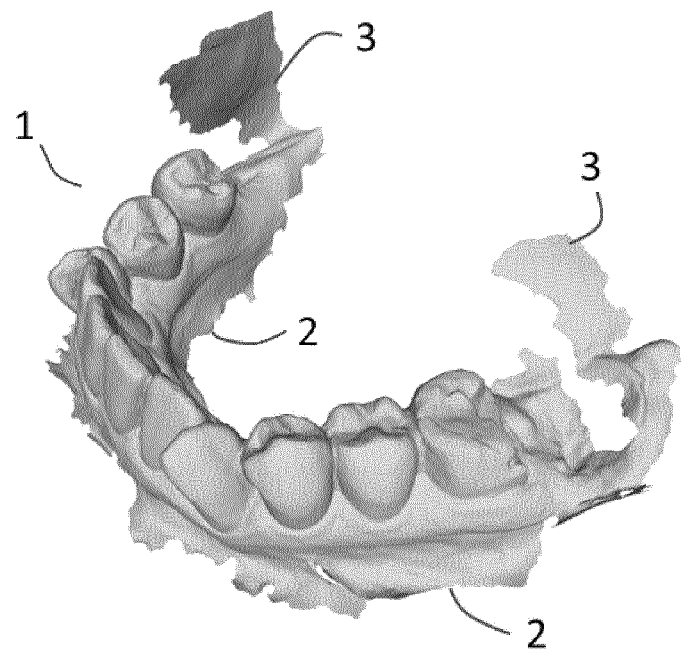
FIG. 1: Example of an intraoral surface scan (1) with jagged outer boundary (2) and several large flap regions (3).

The present invention will be described with respect to particular embodiments and with reference to certain drawings, but the invention is not limited thereto but only by the claims. Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

"Surface mesh" as used herein refers to a polygon surface mesh model comprising a collection of vertices, edges and faces that define the shape of a polyhedral surface representation. The skilled person will understand that within the context of the present invention the term "surface mesh" may also refer to an organized point cloud wherein the neighbourhood relations between the points are defined. Surface meshes and organized point clouds are frequently used in 3D computer graphics. For instance, 3D surface data obtained using a scanning device, such as for instance a 3D intraoral scanner, can be digitally stored and/or displayed as a surface mesh or organized point cloud.

"Open surface mesh" is used herein to refer to a surface mesh comprising an inner mesh region delineated by an outer boundary of boundary vertices and boundary edges connecting said boundary vertices. These boundary vertices are characterized in that they are not fully surrounded by other vertices. The inner mesh region may comprise one or more holes, defined by a plurality of connected boundary vertices delineating an area of lacking surface data. Within the present invention the outer boundary of an open surface mesh preferably corresponds the longest stretch of connected boundary vertices of the surface mesh.

"Trimming" is used herein to refer to removing a boundary region of an open surface mesh. Typically, the trimming of an open surface mesh involves the full or partial inward repositioning of the mesh outer boundary on the original mesh surface.

"Function value" is used herein to refer to a value that is computed for a given mesh position, for instance a specific vertex or a position on an edge connecting two vertices, by applying a function on said mesh, wherein said function comprises a measure indicative of a local surface mesh property as an independent variable. In a preferred embodiment this function is a heat transfer function and said function value is a virtual temperature.

"Isoline" is used herein to refer to a line traced on said open surface mesh joining mesh positions with the same function value. In the context of the present invention these isolines form preferably closed curves enclosing a region of the open surface mesh. For instance, when applying a heat transfer function on an open surface mesh an isoline correspond to the isotherm connecting the positions on said mesh with the same virtual temperature.

Figure 6:
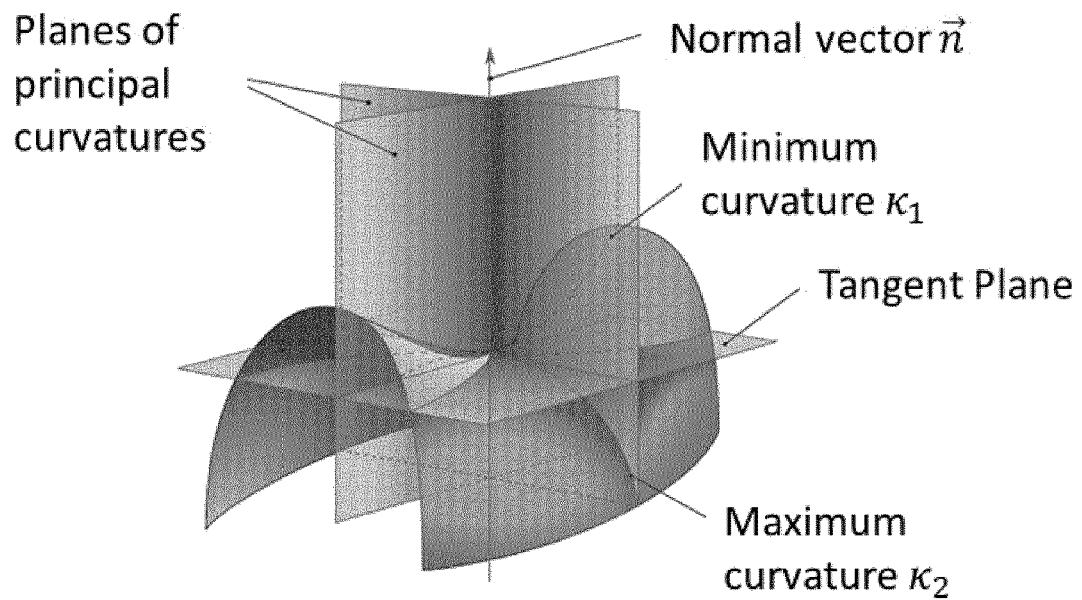
FIG. 6: View of the planes establishing the principal curvatures on a surface (adapted from an image by Steve Garvie, distributed under GFDL).

"Curvature" as used herein refers to the deviation of a surface from being a flat plane. Such deviation from a flat plane may be "convex" meaning that surfaces bulges outward or "concave" meaning that surface bulges inward. Different measures for describing the curvature are available. Considering that the curvature of a surface can be determined in multiple directions (FIG. 6), it is preferred that this measure combines for a given mesh position the curvatures of different directions into a single value. Examples of such measures are the "mean curvature" and "Gaussian curvature" as defined in Section 3.2. Following this definition the mean curvature will be positive if at a given position the overall surface curvature is convex and negative if the overall curvature is concave. Certain open surface meshes locally have minor curvature variations within regions with an overall convex or concave curvature. The noise resulting from this local curvature variations can be resolved by smoothing the curvature measure, such as the mean curvature, over the open surface mesh or region thereof.

"Colour" as used herein refers to a perceived optical characteristic, including one or more of the following: hue, chroma, value, translucency, reflectance. In digital applications colour data can be available as colour codes associated with the surface mesh positions. Such colour code may be a combination of colorant values, for example, red (R), green (G) and blue (B), collectively RGB, in an additive colour space, or cyan (C), magenta (M), yellow (Y) and black (B), collectively CMYK, in a subtractive colour space. Further, YCbCr, Y'CbCr, or Y Pb/Cb Pr/Cr, also written as YCBCR or Y'CBCR, is a frequently used family of colour spaces as part of the colour image pipeline in video and digital photography systems (with Y' the luma component, CB and CR are the blue-difference and red-difference chroma components and Y the luminance component).

"Geodesic distance" as used herein refers to the distance between two mesh vertices in a mesh, measured along the mesh, i.e. the total length of the edges in a shortest path connecting said vertices. At different instances in the description of the present invention reference is made to a "boundary geodesic distance". This term is used to refer to the shortest distance between boundary vertices along a path defined by the boundary edges connecting these boundary vertices.

The use of 3D surface mesh models constructed from 3D scanning data have become common place in many different applications varying from entertainment to the planning of medical and dental interventions. When 3D surface data is acquired of only a part of an object, either because no 3D model of the entire object is needed or because certain parts of the object cannot be adequately brought within the field of view of the 3D scanning equipment, an open surface mesh model may be obtained comprising an inner mesh region delineated by outer boundary vertices and the edges connecting these vertices. Often the boundary of such open surface mesh is irregular or jagged, for instance because of incomplete scanning within the boundary region. Furthermore, the boundary region of the open surface mesh may comprise extensions or protruding flap regions comprising surface data of object parts outside of the zone of interest that are incidentally scanned. In general, an irregular and spurious boundary region is undesired when presenting an open surface mesh model. Furthermore, unnecessary or inaccurate data in the boundary region may hamper the adequate use of the mesh models in certain applications. For instance, when overlaying the open surface mesh over an another 2D or 3D image said flap regions may hide relevant information in the underlying image. An example of an open surface mesh model is the surface representation of a patient's intraoral cavity showing the dental arch as obtained using a 3D intraoral scanner (IOS). FIG. 1 shows an intraoral scan model with a jagged boundary and large flap regions. Another example of an open surface mesh with a spurious boundary region is the 3D surface mesh of a partially scanned surface of a person's head as presented in FIG. 4. To remove these flap regions and to somewhat smoothen the mesh boundary, presently available software products for processing surface meshes allow the user to manually trim the boundary region of an open surface model by indicating on a displayed surface model a cut-off line for trimming. This manual trimming is time consuming and does not really provide a desired smooth boundary of the trimmed open surface mesh. Therefore, it is an object of the present invention to provide a computer-based method enabling the semi-automated or automated trimming of the boundary region of open surface meshes, including intraoral surface models, resulting in the removal of flap regions and warranting a smooth boundary without modifying or adding artificial surface area to the mesh model. The trimming method of the present invention typically involves the inward repositioning of the mesh outer boundary on the original surface mesh, while minimizing or avoiding the addition of new surface or the introduction of modifications to the part of the surface mesh that is retained after trimming.

In an initial step the computer-based trimming method of the present invention comprises receiving an open surface mesh. This open surface mesh may be received as data from a 3D scanning system or as an electronic file comprising the open surface mesh data. The method further comprises determining a region of said open surface mesh, which should be maintained after trimming and eventually trimming the open surface mesh by removing from said mesh the region or regions outside said region to be maintained. Determining said region to be maintained may comprise the steps of:
   computing function values for a plurality of positions on said open surface mesh wherein said function values gradually vary over said mesh preferably in relation to a measure indicative of a local surface mesh property, and
   identifying an open surface mesh region to be maintained after trimming wherein said region groups mesh positions with function values within a selected range.

More preferably determining said region to be maintained comprises the steps of:
   computing function values for a plurality of positions on said open surface mesh wherein said function values gradually vary over said mesh preferably in relation to a measure indicative of a local surface mesh property,
   calculating one or more isolines from said function values, such isoline joining surface mesh positions with the same function value,
   selecting an isoline enclosing a region of interest of said open surface mesh,
   using said selected isoline for defining a cut-off line enclosing the surface mesh region to be maintained after trimming.

Typically, these function values are computed by applying a function on said mesh, wherein said function comprises a measure indicative of a local surface mesh property as an independent variable. Preferably, said values are computed for a plurality of positions spread over at least a region bordering the entire outer boundary of an open surface mesh, more preferably said values are calculated for positions spread over the entire mesh surface. Typically, the function values are at least computed for the vertex positions of the open surface mesh or any region thereof. In certain embodiments, the function value for a position on an edge between two vertices is obtained by interpolation from the function values of the vertices connected by said edge.

Preferably, the computed function values vary in relation to a measure indicative of a local surface mesh property selected from a measure for the distance between a mesh position and the outer boundary, a measure indicative of the surface curvature at a mesh position or a measure indicative of the colour at a mesh position. Preferably, said distance measure is the geodesic or Euclidean distance between a mesh position and the outer boundary. Considering that the curvature of a surface can be determined in multiple directions (FIG. 6), it is preferred that said measure describing the mesh curvature combines for a given mesh position the curvatures of different directions into a single value. Therefore, particularly suitable curvature measures were found to be the Gaussian curvature and mean curvature, respectively. Certain open surface meshes, including those representing intraoral surfaces, may have local minor curvature variations within regions with an overall convex or concave curvature. For such meshes it was found advantageous to smooth or blur the curvature measures found for the respective mesh positions. Different types of colour codes are suitable to be used as measures indicative of the mesh colour. In certain embodiments it is advantageous to smooth or blur the colour measures found for the respective mesh positions.

In a particular embodiment the method of the present invention comprises calculating on said open surface mesh two or more isolines each with a different function value and selecting one of said isolines as the isoline enclosing a surface mesh region of interest. The selection of this isoline may involve presenting on a display a representation of the surface mesh with indication of the two or more calculated isolines and selection by a user of one of said isolines as the isoline enclosing the mesh region of interest. Alternatively, this isoline can be automatically selected using an optimisation function and appropriate optimisation criteria. In certain embodiments said isolines are calculated to be uniformly spaced. A plurality of uniformly-spaced isolines can be calculated by dividing the range between the calculated lowest ($f_{min}$) and highest ($f_{max}$) function value into S equidistant intervals thus defining an ordered set of S+1 isolines wherein the difference between isoline values of two neighbouring isolines is $$\frac{1}{s}(f_{max} - f_{min}).$$

In other words, uniformly-spaced isolines are characterized in that the absolute difference between the function value of an isoline and that of a neighbouring isoline is identical for all isolines. Uniformly-spaced isolines were found particularly useful in case of automatic isoline selection using an optimisation function. In a particular embodiment the isoline enclosing a region of interest is automatically selected from three or more uniformly-spaced isolines using an optimization function considering following optimization criteria (i) minimal average distance between the selected isoline and its neighbouring isolines and (ii) maximal total surface area within the selected isoline.

The isoline selected to enclose a region of interest may as such serve as the cut-off line for trimming the open surface mesh. Alternatively, a post-processing step is carried out wherein said selected isoline is used as a reference for defining said cut-off line. For instance, a user can manually define said cut-off line by moving the position of the selected isoline or parts thereof on a display of the surface mesh model. Preferably, the cut-off line is automatically defined from said selected isoline. It was found that a suitable strategy for automatically defining the cut-off line from the selected isoline comprised positioning the cut-off line on the mesh nearer to the outer boundary than the selected isoline where the smallest distance between said outer boundary and the selected isoline is below a threshold distance, while the position of the cut-off line is defined to substantially coincide with that of the selected isoline where the smallest distance between said outer boundary and the selected isoline exceeds said threshold distance.

Once the cut-off line is established, the open surface mesh is trimmed by removing the surface mesh regions between said cut-off line and the outer boundary of said open surface mesh. The cut-off line may cut through one or more polygons of the open surface mesh, such that at least one polygon vertex is within the region enclosed by said isoline and at least one polygon vertex is outside this region. Therefore, it is preferred that said trimming of the mesh comprises a step of reconstructing new surface mesh polygons where this line cuts through original polygons of the open surface mesh. This reconstruction typically includes introducing new boundary vertices at positions where the cut-off line crosses edges between vertices.

In a particular embodiment, computing the function values for a plurality of mesh positions according to the present invention comprises applying a diffusion function on an open surface mesh using an equation of the type $$\frac{\partial f(v, t)}{\partial t} = \nabla \cdot A \nabla f(v, t), \quad (e1)$$

and applying boundary conditions specifying the function values of a solution of said equation along the outer boundary of said open surface mesh, wherein v is a spatial position, t is time, $\nabla \cdot$ is a divergence operator, A is a positive definite matrix, $\nabla$ is a gradient operator and $f$ is a function defined on said open surface mesh. Such diffusion function describing the evolution in time of the spatial distribution of a quantity over said open surface. Preferably, the diffusion function comprises an independent variable that is a measure of a local surface mesh property selected from a measure for the distance between a mesh position and the outer boundary, a measure indicative of the surface curvature at a mesh position or a measure indicative of the colour at a mesh position. The function values may be obtained from either an intermediate solution or steady state solution of said diffusion equation. In as far as the applied diffusion equation and boundary conditions warrant a non-uniform steady state solution, wherein the resulting function values vary over the mesh, the use of a steady state solution offers several advantages over an intermediate solution. The use of an intermediary solution requires iterating using a time step, defining a stop criterion, and handling different numerical stability issues. It is also an expensive operation in terms of computing time when processing relatively large surface meshes. On the other hand, a steady state solution can be obtained by solving a linear system of equations. The use of a diffusion function has the advantage that isolines calculated from the resulting function values have smooth trajectories over said mesh. Typically, a cut-off line obtained from such isoline inherits the smooth trajectory, thus warranting a smooth boundary of the eventually trimmed open surface mesh.

In a particular embodiment, the user may also specify boundary conditions for selected vertices within the inner mesh region, thus specifying the function values of a solution of said equation for said inner mesh vertices. The user may for instance specify the boundary conditions for inner mesh vertices by indicating an inner mesh region on a display of the mesh and entering a function value for the vertices within said mesh region.

An open surface mesh can be thought of as an infinitely thin heat conducting plate. So, in a further particular embodiment applying said diffusion function over said mesh comprises using a heat equation of the type $$\frac{\partial u(v, t)}{\partial t} = \alpha \nabla^2 u(v, t), \quad (e2)$$

wherein $\alpha \nabla^2 u(v, t)$ specifies a thermal diffusion term with $\alpha$ being a diffusion coefficient $$\left(\frac{m^2}{s}\right)$$

describing a virtual neat transfer over said mesh and $\nabla^2 u$ denoting the Laplace-Beltrami operator applied to the function u and wherein u(v, t) returns a virtual temperature for a given surface mesh position. An isoline joining mesh positions with a same function value (temperature) as obtained from either an intermediate or steady state solution of such equation can be thought of as an isotherm over said mesh. Preferably, said heat equation further comprises a heat dissipation term $-\lambda$ u(v, t) providing an equation $$\frac{\partial u(v, t)}{\partial t} = \alpha \nabla^2 u(v, t) - \lambda u(v, t), \quad (12)$$

with $\lambda$ denoting a heat dissipation coefficient ($s^{-1}$), with $\lambda \geq 0$. In certain embodiments the heat diffusion coefficient ($\alpha$) and/or the heat dissipation coefficient ($\lambda$) vary depending on the local variation of an open surface mesh property. Such mesh property may be the curvature, distance from the outer boundary or mesh colour as previously described. For instance, the heat dissipation coefficient ($\lambda$) may increase with increasing geodesic distance between a mesh position and the outer boundary. In this way function values (virtual temperatures) in the internal mesh region will tend to be 'cooler' than those in the mesh region neighbouring the outer boundary, certainly with boundary conditions setting the outer boundary as a heat source. In a further example, the heat dissipation coefficient (λ) may increase with a colour measure indicative of a white or yellow shade favouring 'cooler' function values (virtual temperatures) within yellow-white surface mesh regions. In yet a further example, the heat diffusion coefficient (α) and/or the heat dissipation coefficient (λ) may increase with the increase of a measure indicative of the convexity of the surface mesh favouring 'cooler' function values within convex mesh regions. In a particular example computing said function values comprises the use of a heat equation (12) wherein the heat dissipation coefficient (λ) is dependent on a smoothed mean curvature ($\bar{\kappa}$) measure with λ increasing with increasing positive $\bar{\kappa}$ ($\lambda(\bar{\kappa})=\max(0, \beta\bar{\kappa})(14)$).

Interestingly, computing said function values using a heat diffusion function wherein the heat diffusion coefficient (α) and/or the heat dissipation coefficient (λ) vary depending on a measure indicative of a mesh property may provide a solution wherein isolines with different function values are positioned close to one another in certain regions of the mesh. Said close positioning of the isolines may more readily be observed with uniformly-spaced isolines. A plurality of uniformly-spaced isolines can be calculated by dividing the range between the calculated lowest ($u_{min}$) and highest ($u_{max}$) virtual temperature into S equidistant intervals thus defining an ordered set of S+1 isolines wherein the difference between isoline values of two neighbouring isolines is $$\frac{1}{s}(u_{max} - u_{min}).$$

For example, using a heat diffusion equation with a heat dissipation coefficient (λ) that increases with increasing convexity for positive mean curvature ($\lambda(\bar{\kappa})=\max(0, \beta\bar{\kappa})$) uniformly-spaced isolines are typically closely positioned in transition regions of the open surface mesh where concave and convex regions border one another.

The use of a diffusion function and boundary conditions resulting in regions with closely positioned isolines, may advantageously contribute to automatically selecting the isoline enclosing the region of interest. For instance, from a plurality of calculated isolines this isoline can be automatically selected using an optimization function considering following optimization criteria (i) minimal average distance between the selected isoline and its neighbouring isolines and (ii) maximal total surface area within the selected isoline. In case the convex areas of an open surface mesh are of interest, it is advised to use an approach that provides a dense alignment of isolines, preferably uniformly-spaced isolines, in certain mesh regions wherein concave and convex regions border one another. As previously indicated such solution can be obtained from function values computed with a heat diffusion function (12) with a heat dissipation coefficient (λ) that increases with increasing convexity for positive mean curvature ($\lambda(\bar{\kappa})=\max(0, \beta\bar{\kappa})$). From the plurality of calculated isolines the isoline enclosing the region of interest can then be automatically determined using an optimization function considering following optimization criteria (i) minimal average distance between the selected isoline and its neighbouring isolines and (ii) maximal total surface area within the selected isoline and (iii) maximal total mean or total smoothed mean curvature of the surface mesh region within the selected isoline.

In certain embodiments involving a heat diffusion function, the user may specify boundary conditions for vertices of a selected inner mesh regions by setting either high temperature function values (for instance the same temperature as set for the outer boundary vertices) or low temperature function values for said vertices. These settings will determine whether such region will be more likely within or outside the isoline selected for defining the cut-off line. Alternatively, the vertices of a selected inner mesh region are defined as a heat source or a heat sink. When using this alternative approach applying a heat diffusion function requires the use of a heat equation (12) adjusted to include a force term F, which is negative for heat sinks, positive for heat sources and 0 for other inner vertices:

$$\frac{\partial u(v, t)}{\partial t} = \alpha \nabla^2 u(v, t) - \lambda u(v, t) + F(v) = 0, \tag{30}$$

As previously indicated the isoline selected to enclose a region of interest may as such serve as the cut-off line for trimming the open surface mesh or the method of the present invention may comprise a post-processing step wherein the selected isoline is used as a reference for defining the cut-off line. Typically, the cut-off line is identified in a post-processing step using the selected isoline as a reference for identifying said cut-off line, wherein relative to the selected isoline said cut-off line is moved towards the outer boundary at positions where the shortest distance between the selected isoline and the outer boundary is below a threshold value and wherein said cut-off line is substantially maintained at the level of the selected isoline at positions where the minimal distance between the selected isoline and the outer boundary exceeds said threshold value. In an embodiment, this post-processing step involves recomputing function values for a plurality of positions on said open surface mesh by applying on said mesh a diffusion function using adapted boundary conditions. Subsequently, one or more new isolines are calculated from said recomputed function values. These adapted boundary conditions are preferably set to favour a solution wherein as compared to the initial isolines the positions of new isolines (i) shift towards the outer boundary where the smallest distance between the said initially selected isoline and the outer boundary is below a threshold distance, and (ii) are substantially maintained where this smallest distance exceeds said threshold distance. For instance, such new isolines can be calculated from the function values (virtual temperatures) computed using a heat diffusion function with boundary conditions fixing the temperature at positions along the outer boundary, wherein for outer boundary positions, for which the shortest distance between a said position and the initially selected isoline is below a threshold distance the temperature is set lower level than for outer boundary positions for which said smallest distance exceeds said threshold distance. Preferably, said outer boundary positions are outer boundary vertices and said shortest distance is the shortest Euclidean distance between a said outer boundary vertex and a vertex of the selected isoline. In case said surface mesh is an intraoral surface mesh said threshold distance is preferably set at 3 mm. After calculation of the new isolines, one of said new isolines is selected as the isoline enclosing a region of interest of said open surface mesh. Finally, this newly selected isoline is used in defining a cut-off line enclosing the surface mesh region to be maintained after trimming, wherein said newly selected isoline either serves as the cut-off line or is used as a reference in a further step for identifying the cut-off line.

Figure 16:
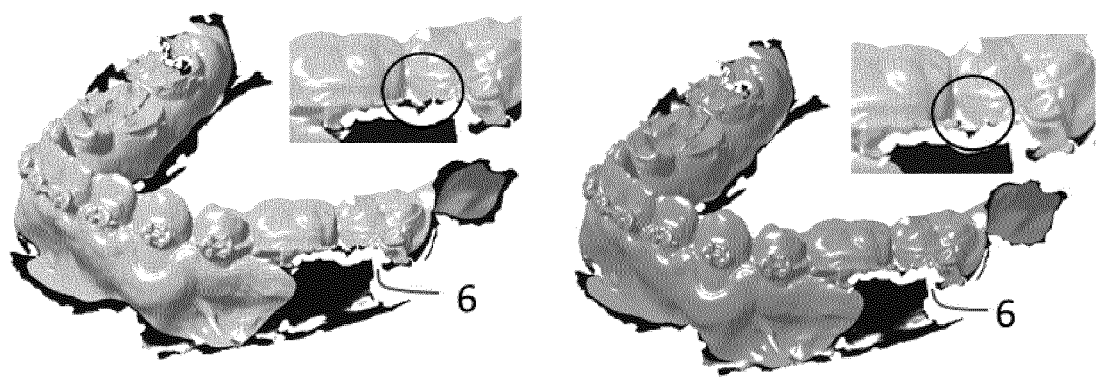
FIG. 16: Comparison of the cut-off lines identified with different post-processing steps for an intraoral surface mesh with a crack (6) in the molar region.
Figure 16:
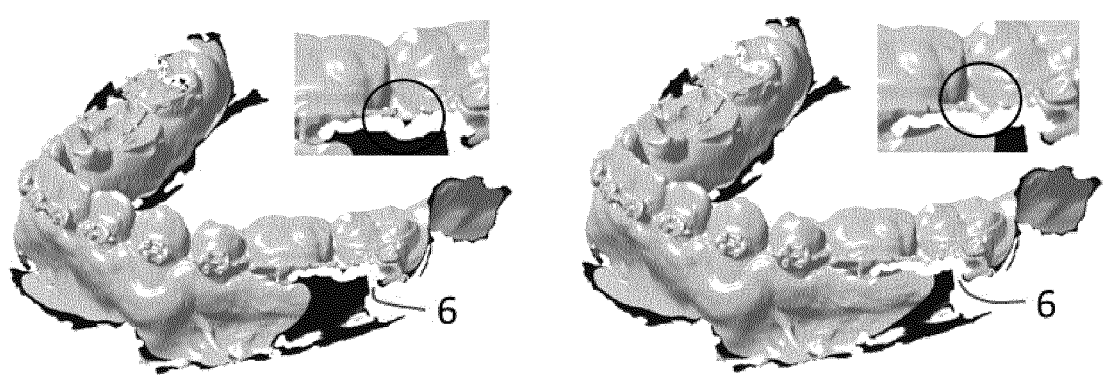

Certain open surface meshes comprise so-called cracks, which are elongated areas lacking scanning data that are delineated by an outer boundary segment that bends into the surface mesh (FIG. 16; 6). When these cracks are due to lack of data because of incomplete scanning they are associated with an artefactual outer boundary segment and may give rise to undesired trimming of the open surface mesh. Therefore, it may be advantageous to identify the outer boundary segments delineating such cracks. In an embodiment the method of the present invention comprises an initial selection of an isoline enclosing a surface mesh area of interest as previously described, followed by a post-processing step comprising the use of said initially selected isoline in the identification of outer boundary segments that either delineate cracks and bend into said open surface mesh or that delineate protruding flap regions of said mesh. Said post-processing step further comprises defining the cut-off line using the data on either or both these in-bending or protruding outer boundary segments. In a first step identifying said in-bending or protruding outer boundary segments comprises determining for each boundary vertex the distances along the outer boundary, referred to as boundary geodesic distance and the Euclidean distances between said outer boundary vertex and neighbouring outer boundary vertices within a region surrounding said boundary vertex. This region encompassing the neighbouring boundary vertices can be imagined as a volume, typically a sphere or cube, with said outer boundary vertex in its centre. Preferably, the diameter of said volume is between 1 and 3 times the expected width of a crack or flap region, for instance between 1.5 and 2 times said width. In case the open surface mesh is an intraoral surface mesh, the diameter of said volume is preferable between 2 and 10 mm, such as between 4 and 8 mm, such as for instance 6 mm. An outer boundary vertex is detected as a vertex of an in-bending or protruding outer boundary segment when the ratio of said boundary geodesic distance over said Euclidean distance between said outer boundary vertex and a said neighbouring outer boundary vertex exceeds a threshold value.

In a further step pairs of entrance vertices are identified, which define the start and end points of in-bending or protruding boundary segments. The identification of these pairs of entrance vertices typically comprises the steps of:
  identifying for each outer boundary vertex detected to be in an in-bending or protruding outer boundary segment the neighbouring boundary vertex with the highest said ratio of boundary geodesic distance over Euclidean distance as the corresponding boundary vertex;
  retaining the detected vertices that have each other as corresponding boundary vertices as candidate pairs of entrance vertices;
  comparing said retained pairs of candidate entrance vertices wherein a pair of candidate entrance vertices is discarded when the outer boundary vertices along the shortest path between said candidate entrance vertices are a subset of the outer boundary vertices between another pair of candidate entrance vertices; and
  labelling the remaining pairs of candidate entrance vertices as pairs of entrance vertices of in-bending or protruding boundary segments.

An outer boundary segment defined by a said pair of entrance vertices is subsequently labelled as an in-bending outer boundary segment delineating a crack or an outer boundary segments delineating a protruding flap region. Preferably, such outer boundary segment is labelled as an in-bending outer boundary segment in case all shortest distances, preferably Euclidean distances, between the respective vertices of said segment, including the entrance pair vertices, and the initially selected isoline are below a threshold distance. In case of an intraoral surface mesh, this threshold distance is preferably set between 1 and 10 mm, such as between 2 and 6 mm, for instance at 3 mm. It is further preferred that such outer boundary segment is labelled as an outer boundary segment delineating a protruding flap region in case the shortest distance between at least one vertex of said segment, including the entrance pair vertices, and the initially selected isoline exceeds a threshold distance. In case of an intraoral surface mesh, this threshold distance is preferably set at between 1 and 10 mm, such as between 2 and 6 mm, for instance at 3 mm.

Following said identification of the in-bending and protruding outer boundary segments this data can be used for defining a cut-off line. Preferably such identification comprises recomputing function values by applying a said diffusion function over said mesh using specific boundary conditions along said in-bending boundary segments and/or protruding boundary segments. From these recomputed function values one or more new isolines are calculated and one of said isolines is selected as the isoline enclosing the region of interest. The newly selected isoline may serve as a cut-off line for trimming the open surface mesh or can be used as a said reference in a further step. In a particular example the said post-processing step comprises recomputing function values (virtual temperatures) for a plurality of mesh position using a heat diffusion function with boundary conditions fixing the temperature at positions along the outer boundary, wherein the temperature at an in-bending outer boundary segment is set lower than at other outer boundary segments resulting in relatively lower mesh surface temperatures at inner mesh positions near said in-bending segments. Isolines calculated from these surface mesh temperatures tend to shift towards the in-bending outer boundary segments. Alternatively, no boundary conditions are defined for the outer boundary vertices within in-bending segments, which also results in such shift of the isolines towards these in-bending segments.

A further embodiment comprises a post-processing step wherein the user after having viewed an initial cut-off line obtained according to a method of the present invention may edit the surface mesh to include or exclude certain selected mesh regions in the surface mesh region to be maintained after trimming as determined by reapplying a heat diffusion function on said mesh. Such editing may comprise specifying boundary conditions for the vertices of selected inner mesh regions by setting either high temperature function values (for instance the same temperature as set for the outer boundary vertices) or low temperature function values for said vertices. These settings will determine whether such region will be more likely within or outside the isoline selected for defining the cut-off line when reapplying a heat diffusion function (12) on said mesh. Alternatively, this editing may comprise defining the vertices of these selected inner mesh regions as a heat source or a heat sink. When using this alternative approach reapplying a heat diffusion function requires the use of a heat equation (12) adjusted to include a force term F, which is negative for heat sinks, positive for heat sources and 0 for other inner surface vertices:

$$\frac{\partial u(v, t)}{\partial t} = \alpha \nabla^2 u(v, t) - \lambda u(v, t) + F(v) = 0, \quad (30)$$

Considering that the effect of a heat sink or source defined by a force term is typically limited to the selected mesh region and surrounding area it may be possible to only locally reapply the heat diffusion function (30) thus reducing the computing time in this post-processing step. From the post-processing step according to this embodiment an isoline can be selected for defining a cut-off line as previously described.

In certain embodiments of the present invention the open surface mesh is an intraoral surface mesh, representing a part of the intraoral surface of a human or animal subject. Generally, said intraoral surface mesh comprises a convex dental arch or jaw bone region and one or more concave boundary regions, typically representing cheek, lip or tongue surfaces. Such intraoral surface mesh may be acquired by directly scanning a patient's intraoral cavity using a 3D intraoral scanning device or by optical or tactile scanning of a bite impression or a cast thereof, for instance a plaster cast. Within dentistry and maxillofacial surgery such intraoral surface mesh may be acquired for either diagnostic purposes, for the planning of a surgical intervention or as a reference in the design and preparation of a (dental) prosthesis. In most of these applications the convex dental arch or in case of partially or fully edentulous patients the soft tissue covered convex jaw bone region is of particular interest, while data of the intraoral surface mesh regions representing concave tongue, lip or cheek regions are considered less relevant or are undesired. When applying the method of the present invention for trimming an intraoral surface mesh it was found advantageous to compute said function values using a function comprising a measure for the local mesh surface curvature, such as the mean or Gaussian curvature, as an independent variable. As previously indicated, it is preferred that said curvature measure is smoothed or blurred, thus reducing the impact of minor local curvature variations. In a particular embodiment, the method according to the present invention comprises computing said function values for a plurality of mesh positions by applying a heat diffusion function on said intraoral surface mesh using an equation (12) comprising a heat diffusion term and a heat dissipation term, wherein the heat diffusion coefficient ($\alpha$) and/or the heat dissipation coefficient ($\lambda$) are/is dependent on the local surface curvature of said intraoral surface mesh. For instance, determining said cut-off line may comprise the use of a heat equation (12) wherein the heat dissipation coefficient ($\lambda$) is dependent on a smoothed mean curvature ($\bar{\kappa}$) measure with $\lambda$ increasing with increasing positive $\bar{\kappa}$ ($\lambda(\bar{\kappa})$=max(0, $\beta\bar{\kappa}$)). Further, the calculation of the function values may also take into account colour data associated with the intraoral surface mesh. Mesh positions associated with a colour measure indicative of a white or yellow shade likely are within a mesh region representing a tooth material, while positions associated with measures indicative of a red or pink shade likely are within a soft tissue region. This colour information can be considered when computing the function values by setting certain boundary conditions for positions associated with certain colour codes and/or by introducing a colour measure as an independent variable in the function for computing said function values.

For an intraoral surface mesh, the calculation of the isolines from function values computed using a function comprising a measure reflecting local mesh curvature as an independent variable, revealed that these isolines tend to be more densely positioned in transition regions between concave and convex surface mesh parts. As previously indicated, this dense positioning in said transition regions was best observed with uniformly-spaced isolines. This local dense spacing of the isolines proved useful in procedures for automatically selecting an isoline enclosing a convex dental arch region of interest. In an embodiment, the step of automatically selecting the isoline enclosing a region of interest comprised using an optimization function combining following optimization criteria (i) minimal average distance between the selected isoline and its neighbouring isolines, (ii) maximal total surface area within the selected isoline and (iii) maximal total mean curvature within the selected isoline. This automatic selected isoline is used as the cut-off line for trimming the intraoral surface or is used as a reference in a postprocessing step for defining a cut-off line as previously described.

The trimming method of the present invention was found to be particularly useful in 3D scanning software as a final step of a scanning procedure. For instance, when used in intraoral scanning software it allows to conclude a scanning session with a smoothly trimmed intraoral surface mesh. Alternatively, the method of the present invention is used as an initial trimming step in software applications that receive and process the output of a scanning procedure. For instance, in digital dentistry applications different types of software use intraoral surface meshes resulting from optical scanning procedures as an input. CAD/CAM software applications for designing dental prosthesis use intraoral surface meshes as reference for designing a prosthesis. The intraoral surface mesh as received and processed by this CAD/CAM software may be exported to a rapid prototyping device for generating a physical model of the patient's intraoral situation. The surface mesh is generally trimmed as part of the procedure of generating an electronic file suitable for driving the rapid prototyping. Surgery planning software, such as implant or maxillofacial surgery planning software, also uses intraoral surface meshes as an input. In such planning software an intraoral surface mesh may be matched with corresponding CT-scan data of a patient's skull. This matching often requires adequate trimming of the intraoral surface mesh to avoid undesired interference of the spurious boundary region with the matching process.

Illustrative Embodiments

1. Laplace-Beltrami Operator

The Laplace operator $\nabla^2$ captures the second order derivatives of a function u defined on a spatial constellation (like a grid or a mesh). In 3D space, it is defined as $$\nabla^2 u(v) = \frac{\partial^2 u(v)}{\partial x^2} + \frac{\partial^2 u(v)}{\partial y^2} + \frac{\partial^2 u(v)}{\partial z^2} \quad (1)$$

where v denotes vertices with continuous coordinates (x, y, z). This operator can be generalized to operate on functions defined on surfaces in Euclidean space [1, 2]. Commonly an approximation to $\nabla^2 u$ based on finite differences is used. Given a piecewise linear function u: $\mathcal{M} \mapsto \mathbb{R}$ defined on the mesh $\mathcal{M}$, the finite differences based discrete Laplace-Beltrami operator at the vertex $v_i$ is given by $$\nabla^2 u(v_i) = \frac{1}{A_i} \Sigma_{v_j \in \mathcal{N}(v_i)} w_{ij}(u(v_j) - u(v_i)) \quad (2)$$

where $v_j \in \mathcal{N}(v_i)$ are neighbouring vertices of $v_i$ connected by an edge. The triangle edge weights $w_{ij} = w_{ji}$ are commonly defined as $$w_{ij} = \tfrac{1}{2}(\cot \alpha_{ij} + \cot \beta_{ij}). \quad (3)$$

Figure 2:
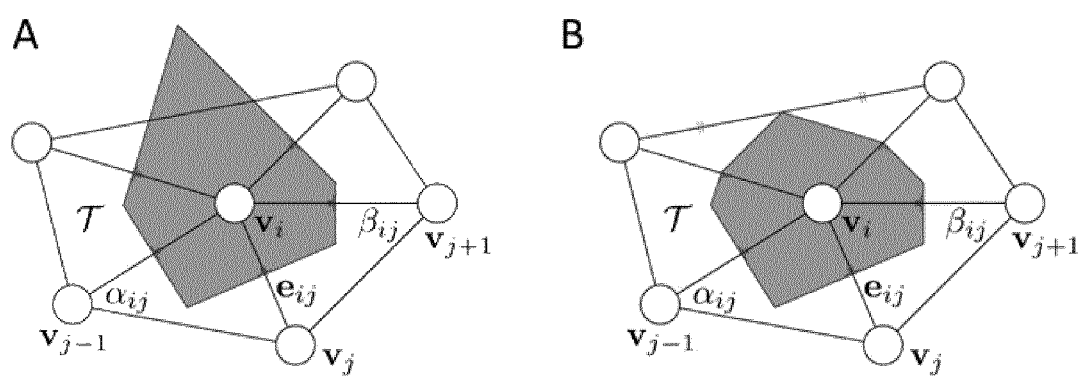
FIG. 2: Voronoi area $A_i$ (A) and mixed area $A_i^*$ (B) of vertex $v_i$ in its 1-ring neighbourhood (grey area). The angles $\alpha_{ij}$ and $\beta_{ij}$ for the edge $e_{ij}=(v_i, v_j)$ are also indicated.

The parameter $A_i$ in (2) is the Voronoi area of vertex $v_i$, while $\alpha_{ij}$ and $\beta_{ij}$ in (3) are the two angles opposite to edge $e_{ij}=(v_i, v_j)$ as illustrated in FIG. 2a. The Voronoi area of vertex $v_i$ is defined as follows [5]:

$$A_i = \frac{1}{8} \Sigma_{v_j \in \mathcal{N}(v_i)} (\cot \alpha_{ij} + \cot \beta_{ij}) \|v_i - v_j\|^2 \quad (4)$$

Since the cotangent terms were already computed in (3), the Voronoi areas can be computed efficiently. However, if there is an obtuse triangle (a triangle with an angle larger than 90°) among the adjacent (i.e. 1-ring) neighbours, the Voronoi region extends beyond the 1-ring as can be seen in FIG. 2a. Therefore, an alternative surface area measure A* was defined in [5] that is visualized in FIG. 2b. Within this example all vertex areas A are preferably mixed vertex areas A*.

Following (2), the discrete Laplace-Beltrami operator for the whole mesh is given by $$\begin{bmatrix} \nabla^2 u(v_1) \\ \vdots \\ \nabla^2 u(v_n) \end{bmatrix} = M^{-1} C \begin{bmatrix} u(v_1) \\ \vdots \\ u(v_n) \end{bmatrix} \quad (5)$$

where M is a diagonal matrix with $(M)_{ii}=A_i$, and C is a symmetric square n×n matrix (with n the number of vertices) given by $$(C)_{ij} = \begin{cases} -\sum_{v_k \in \mathcal{N}(v_i)} w_{ik} & i = j \\ w_{ij} & j \mid v_j \in \mathcal{N}(v_i) \\ 0 & \text{otherwise} \end{cases} \quad (6)$$

2. Calculating Isolines Using a Heat Transfer Model

Heat diffusion is the natural phenomenon of heat transfer through a conductive material from a region of high temperature to a region of low temperature. It can be described by a partial differential equation that gives the distribution of temperature $u(v, t)$ with v the spatial coordinates (e.g. in 3D: (x,y,z)) in a given region over time t:

$$\frac{\partial u(v, t)}{\partial t} = \alpha \nabla^2 u(v, t) - \lambda u(v, t), \quad (12)$$

where $\alpha$ is the thermal diffusion coefficient $$\left( \frac{m^2}{s} \right)$$

and $\nabla^2 u$ denotes the Laplace operator (1) applied to the temperature function u. Further, $\lambda$ denotes the heat dissipation coefficient ($s^{-1}$) which should have a value $\geq 0$. Given an initial temperature profile, heat will diffuse through the medium at a rate controlled by $\alpha$, while heat is lost through heat dissipation at a rate controlled by $\lambda$. Eventually, a steady state temperature is reached when the rate of change in temperature becomes zero. This steady state temperature depends on the boundary conditions applied to the region of interest.

An open surface mesh can be thought of as an infinitely thin metal plate that easily conducts heat. Given certain boundary conditions, a virtual temperature distribution over the open surface mesh can be calculated using the heat diffusion equation (12). The resulting virtual isotherms or isolines of an intermediate or steady state solution provide candidate cut-off lines for trimming a surface mesh boundary region. Preferably, a steady state solution is used as it can be obtained by solving a linear system of equations derived from the finite difference discretization of (12). In contrast, an intermediary solution requires (i) iterating using a certain time step, (ii) defining a stop criterion, and (iii) handling different numerical stability issues. In an embodiment a steady state solution $u^*(v)$, defined by $$\frac{\partial u(v, t)}{\partial t} = 0, \quad (13)$$

is found by fixing the virtual temperature of the outer boundary of the surface mesh to a certain warm temperature (for example $u(v_B)=1°$, with $v_B$ being the outer boundary vertices), thus acting as heat source and applying a heat dissipation term $\lambda$ to all inner surface positions (not part of the outer boundary), thus acting as heat a sink. In general, the outer boundary is defined as the longest stretch of connected boundary vertices of the surface mesh. The surface mesh may comprise boundary vertices that are not part of the outer boundary, for instance boundary vertices delineating a hole in the inner mesh. Such boundary vertices that are not part of outer boundary are considered to be part of the inner mesh ($v_I$).

Figure 3:
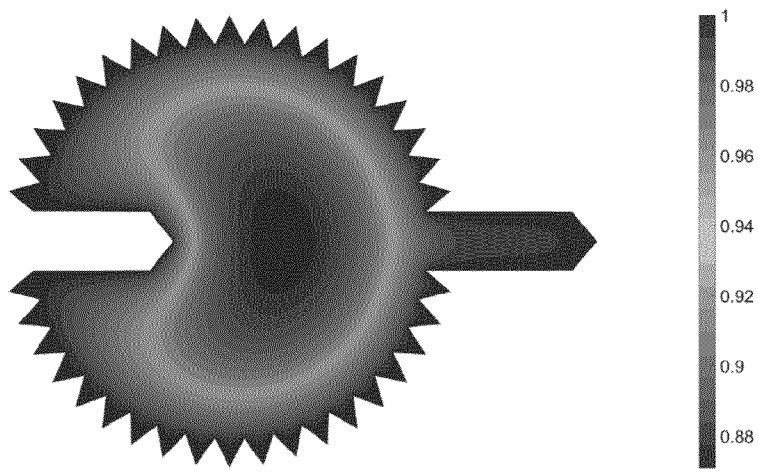
FIG. 3: Black and white representation of a heat map on a 2D toy surface mesh with a noisy boundary, a flap (right) and a crack (left). The circular surface has a radius of 10 mm. Heat diffusion is applied with boundaries kept at a fixed temperature of $u(v_B)=1°$ and with a heat dissipation ($\lambda=0.01$) at all other positions. The steady state solution is visualized with 20 isolines at uniformly spaced temperatures.

FIG. 3 demonstrates the heat diffusion equation (12) applied to a 2D surface with a jagged boundary, an outward flap region and an inward crack. From FIG. 3 it can be concluded that all but the highest temperature isoline have a smooth trajectory and may be selected for defining a cut-offline for replacing the outer noisy boundary.

2.1. Solving the Partial Differential Equation on a Triangle Mesh

At steady state, the dissipative heat equation (12)-(13) can be discretized as follows using the Laplace-Beltrami discretization (5)-(6):

$$\alpha M^{-1} C u(v) - \Lambda u(v) = 0$$

$$(\alpha C - M\Lambda) u(v) = 0$$

$$L u(v) = 0, \quad (15)$$

where $\Lambda$ is a diagonal matrix with a constant $\lambda$ on the diagonal for each vertex i, and $u(v)$ is a column vector of temperatures for each vertex v. Dirichlet boundary conditions are applied to the outer boundary vertices:

$$u(v_B)=1°, \tag{16}$$

Because the values at the boundary are known through (16), the $u(v_B)$ values are no variables anymore. As such, the vector of unknowns u can be separated in (15) into two parts, leading to the following linear system of equations:

$$\begin{bmatrix} L_{II} & L_{IB} \\ L_{BI} & L_{BB} \end{bmatrix} \begin{bmatrix} u(v_I) \\ u(v_B) \end{bmatrix} = 0, \tag{17}$$

where $u(v_I)$ represent inner surface (non-boundary) vertex temperatures, i.e. the domain of calculation. Because $u(v_B)$ is known, only the following equation has to be solved for $u(v_I)$:

$$L_{II}u(v_I) = -L_{IB}u(v_B), \tag{18}$$

This linear system of equations is very sparse which can be exploited by using an adequate linear solver.

Figure 4:
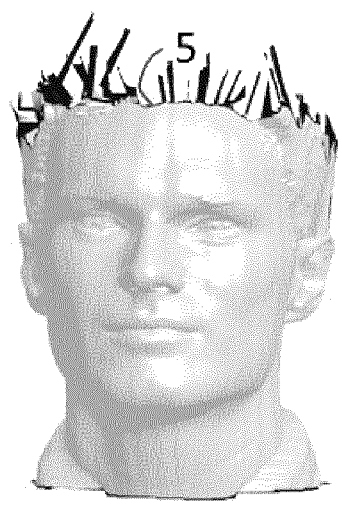
FIG. 4: Open surface mesh with a spurious upper boundary representing a 3D scan of a person's head. A cut-off line (5) was defined for trimming this mesh by applying a heat diffusion function.

2.2. Solving the Partial Differential Equation on a 3D Surface Mesh Representation of a Human Head A 3D image of a person's head was acquired using a Minolta laser scanner. At the edges of the field of view of the camera the data acquisition was erroneous and incomplete. As illustrated in FIG. 4 this resulted in a 3D open surface mesh with spurious flap regions (dark regions) at the upper part of the head. Solving the dissipative heat equation this surface mesh according to section 2.1 provided a virtual isotherm, which allowed defining a cut-off line (5) for trimming the upper spurious flap regions. Resulting in a smooth delineation of the upper part of the head.

Figure 5:
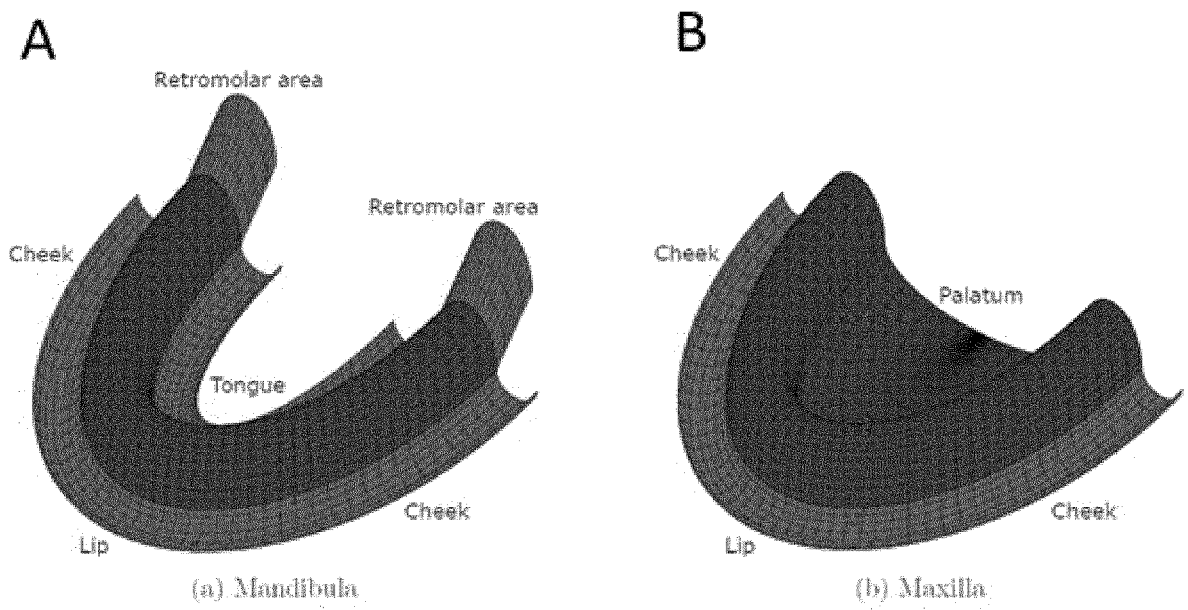
FIG. 5: Simplified representations of the mandibular (A) and maxillary (B) intraoral surface. Typically, in dental practice the darker grey areas are of interest, while the lighter grey areas are trimmed when processing intraoral surface meshes.

3. Calculating Isolines Based on Surface Curvature Analysis 3.1. Curvature of Intra-Oral Regions FIG. 5 shows simplified models of the upper (maxilla) and lower (mandibula) parts of the intraoral region with an indication of the regions that are of particular interest to the dental practitioner, which include the dental arches or corresponding edentulous jaw bone region of both the mandibula and maxilla and the palatum of the maxilla. Typically, the regions of the model representing lip, cheek or tongue parts are of little interest. Furthermore, these areas are difficult to bring into the field of view of an intraoral scanning device resulting in incomplete or incorrect scanning data for these regions. Therefore, it is advantageous that when processing a surface mesh model of an intraoral region for dentistry purposes these lip, cheek and tongue regions are trimmed off. Interestingly, the regions of little interest (cheek, lip and tongue regions) typically have a concave surface area, while the dental arch or jaw bone region is characterised by an overall convex surface area. The palatum has an overall concave surface but is largely enclosed by the convex dental arch. From this it can be understood that analysis of the surface curvature can be used in determining a suitable cut-off line for trimming an open surface mesh representing an intraoral region.

3.2. Determining and Smoothing Mean Surface Curvature

Intuitively, curvature of a surface is the amount by which the surface deviates from being a flat plane. Because of its inherent manifold dimensionality in 3D space, the curvature of a surface can be measured in multiple directions. The maximum and minimum values of curvature are called the principal curvatures $\kappa_1$ and $\kappa_2$ respectively (see FIG. 6). These can be combined in a single measure called the Gaussian curvature $\kappa_G = \kappa_1 \kappa_2$ or the mean curvature $\kappa_H = \frac{1}{2}(\kappa_1 + \kappa_2)$. For the purpose of the present embodiment the mean curvature $\kappa_H$ was used. In the text below the mean curvature is represented by $\kappa$ without the subscript H.

Figure 7:
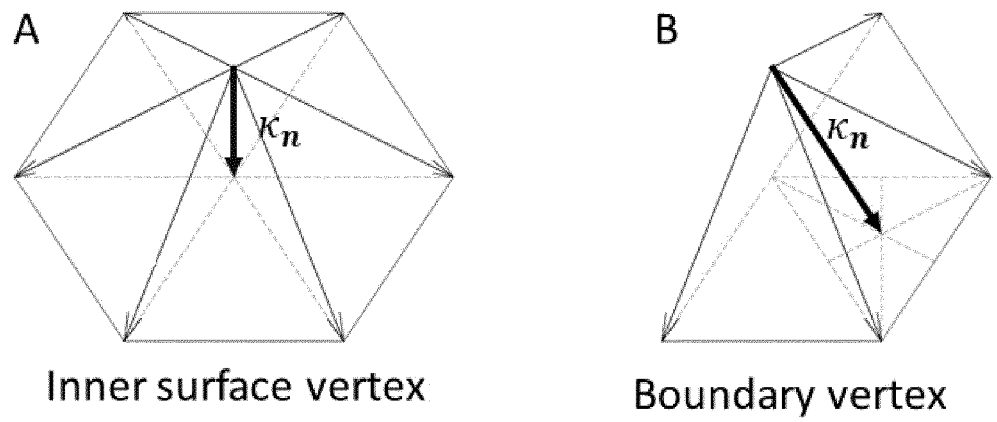
FIG. 7: Schematic view of the 1-ring neighbourhood of an inner surface vertex (A) and a boundary vertex (B). Edge vectors are represented as regular arrows and the mean curvature normal $\kappa_n$ is represented as a bold arrow.

Mean curvature $\kappa$ can be deduced from the mean curvature normal $\kappa_n$, which is a vector normal to the surface with the mean curvature $\kappa$ as magnitude. It can be shown that applying the Laplace-Beltrami operator (2) directly to the mesh vertex coordinates $v_i$ results in [5]:

$$\nabla^2 v_i = -2\kappa_i n_i, \tag{7}$$

where $\kappa_i$ is the mean curvature, and $n_i$ is the vertex normal in vertex $v_i$ defined by the Laplace-Beltrami operator in (2), with $\|n_i\|=1$. Note that $n_i$ points inwards for a convex vertex and outwards for a concave vertex (see also FIG. 7). Also note that the Laplace-Beltrami operator applied to a vector returns a vector, because the operator is applied to each coordinate $(x_i, y_i, z_i)$ separately. Mean curvature can be found by projecting the mean curvature normal $\kappa_n$ on the so-called Gouraud vertex normal $n_G$ which is calculated as the normalized average of the surface normals of the 1-ring faces of that vertex, as follows:

$$n_{G,i} = \frac{\sum_{\mathcal{T}_j \in N(v_i)} n_{\mathcal{T},j}}{\left\| \sum_{\mathcal{T}_j \in N(v_i)} n_{\mathcal{T},j} \right\|} \tag{8}$$

$$\kappa_i = -\frac{1}{2}(\nabla^2 v_i) \cdot n_{G,i},$$

where $\mathcal{T}_j$ represents a triangle in mesh $\mathcal{M}$, and $\mathbf{n}_{\mathcal{T},j}$ is the normal of this triangle. From calculating mean curvatures over surface meshes representing intraoral mandibula areas it was seen that most of the vertices in the dental arch region were convex (positive mean curvature), while most of the vertices in the flap regions (lip, cheek) were concave. Nevertheless, the result could at times be noisy. It was found that the distinction between the concave and convex regions of the surface mesh could be improved by smoothing the mean curvature. A straightforward manner for smoothing a function $f(v, t)$ dependent on vertices v and time t over a mesh is by applying diffusion:

$$\frac{\partial f(v, t)}{\partial t} = \alpha \nabla^2 f(v, t), \tag{9}$$

where α is the diffusion coefficient $$\left(\frac{m^2}{s}\right)$$

and $\nabla^2 f$ is defined by (1). This diffusion equation can for instance be discretized using the Laplace-Beltrami discretization (5)-(6), or by a combinatorial Laplacian such as the umbrella operator [6], where $(C)_{ij}$ is defined as in (6), with $w_{ij}=w_{ji}=1$. Performing an implicit integration, for instance using a backward Euler method, the discretized diffusion equation looks as follows:

$$(I_n - \alpha \Delta t M^{-1} C) f_{t+1} = f_t, \tag{10}$$

where $I_n$ is the identity matrix of size n×n with n the number of vertices, $M^{-1}C$ is the normalized combinatorial Laplacian with M a diagonal matrix of the normalization weights and C the combinatorial Laplacian matrix, and $\Delta t$ is the time step. When we set the initial value to be mean curvature ($f_0=\kappa$), we can solve the following sparse linear system of equations over one time step to find the smoothed mean curvature $\bar{\kappa}$:

$$(I_n - \alpha \Delta t M^{-1} C)\bar{\kappa} = \kappa$$

$$(M - \alpha \Delta t C)\bar{\kappa} = M\kappa \quad (11).$$

We can put $\alpha$ to $$1\frac{m^2}{s}$$

for simplicity. The time step $\Delta t$ can be adjusted to have a sufficient amount of smoothing. Sufficient can be intuitively understood as the amount where convexity has been spread over the dental arch region. Experimentation showed that a time step $\Delta t$ of 25 seconds provided a sufficiently accurate solution provides smoothed mean curvature isolines. One of these isolines could be selected for defining a cut-off lines for trimming the surface mesh.

4. Calculating Isolines by Combining Surface Curvature Analysis and Heat Transfer Modelling

4.1. Incorporating Smoothed Mean Curvature in the Dissipative Heat Transfer Equation For intraoral surface meshes it was found that the differentiation between the dental arch region and the less desired flap regions originating from tongue, lip or cheek regions could be improved using a dissipative heat transfer equation (see (12)) in which the smoothed mean curvature $\bar{\kappa}$ as calculated in section 3.2 was incorporated through the heat dissipation coefficient $\lambda(\bar{\kappa})$:

$$\frac{\partial u(v,t)}{\partial t} = \alpha \nabla^2 u(v,t) - \lambda u(v,t) \quad (14)$$

$$\lambda(\bar{\kappa}) = \max(0, \beta\bar{\kappa}),$$

where $\beta$ is a linear scaling factor. This scaling factor is dependent on the expected size of the mesh and the distance unit. For the particular application of trimming intraoral representations of dental arches with widths of around 60-70 mm $\beta$ was set to 2 and millimetre was used as a distance unit. At steady state the dissipative heat equation (14) incorporating smoothed mean curvature can be solved as indicated in Section 2.1. However, with respect to formula (15) it should be considered that in this case $\Lambda$ is a diagonal matrix with $\lambda(\bar{\kappa}_i)$ on the diagonal for each vertex i.

Figure 8:
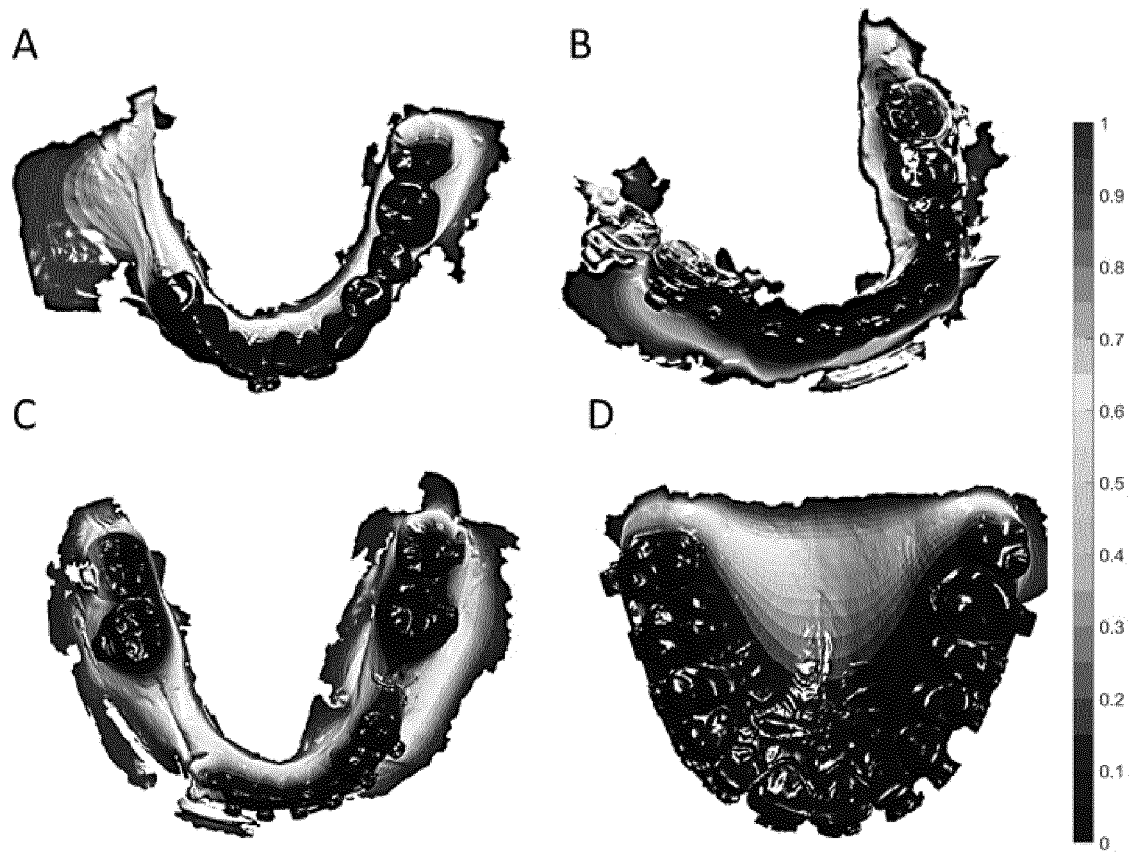
FIG. 8: Black and white representation of a heat map showing isolines resulting from applying a heat diffusion function with a curvature dependent heat dissipation coefficient ($\lambda$) on challenging intraoral surface meshes.

Results of the diffusive heat equation incorporating a smoothed mean curvature applied to some challenging intraoral scans are shown in FIG. 8. As illustrated in FIG. 8d the palate is largely indicated as a 'cool' region, even though this region is concave. The low palate temperature is explained by its short outer boundary as compared to the length of the dental arch enclosing the palate. The palate is only 'heated' via the short outer boundary (see the top of FIG. 8d), while it is 'cooled' from the surrounding dental arch, a convex region with a high heat dissipation (see the left, bottom and right of FIG. 8d). As further illustrated in FIG. 8, incorporating smoothed mean curvature $\bar{\kappa}$ in the dissipation coefficient using (14) has further advantages. First, when $\bar{\kappa} \leq 0$, then $\lambda(\bar{\kappa})=0$ ensuring that concave regions (typically flap regions) do not dissipate heat. As a result, fast virtual heat flows are obtained in these regions. So concave flap regions, even large ones, are easily identified as their temperature is close to the fixed hot boundary temperature (see FIG. 8a). Further, the transition zone between the flap regions (concave) and dental arch region (convex) is marked by a sign change in smoothed mean curvature from negative to positive, providing a sharp temperature transition and consequently isolines that are closely positioned to one another in this zone (see FIG. 9). In addition, the heat dissipation function $\lambda(\bar{\kappa})$ ensures that $\lambda \geq 0$ which is a necessary condition to avoid an ill-posed oscillating solution. This function also permits to adjust the stiffness of the isolines by altering the parameter $\beta$. The lower $\beta$, the stiffer the isolines will be, and vice versa. Taking $\beta$ too low will cause edentulous regions to be excluded, taking $\beta$ too high will not result in smooth isolines. An equilibrium between both was found by setting $\beta$ to about 2 as previously indicated.

4.2. Threshold Function for Automatically Selecting the Isoline Comprising a Surface Mesh Region of Interest.

After applying the heat diffusion equation (14) to an intra-oral surface as described above, a steady state solution is obtained with vertex temperatures $u^*(v)$ in the range [0°, 1°]. This is due to the boundary condition $u(v_B)=1°$ (16) and the heat dissipation that causes an exponential decay in temperature such that 0° is the minimum temperature. Obtaining a smooth boundary and removing the flap regions requires selecting a suitable temperature isolines as cut-off line for the triangle surface mesh. Considering a surface mesh representing an intra-oral scan comprising no flap regions and a relatively smooth boundary, it can be intuitively understood that an temperature isoline with a temperature close to 1° may be suitable for a cut-off line for trimming the surface mesh (almost no surface needs to be removed). On the other hand, for a surface mesh representing an intraoral scan with a large flap region it is to be expected that a temperature isoline with a temperature sufficiently below 1° will have to be selected for defining a suitable cut-off line for trimming.

Figure 9:
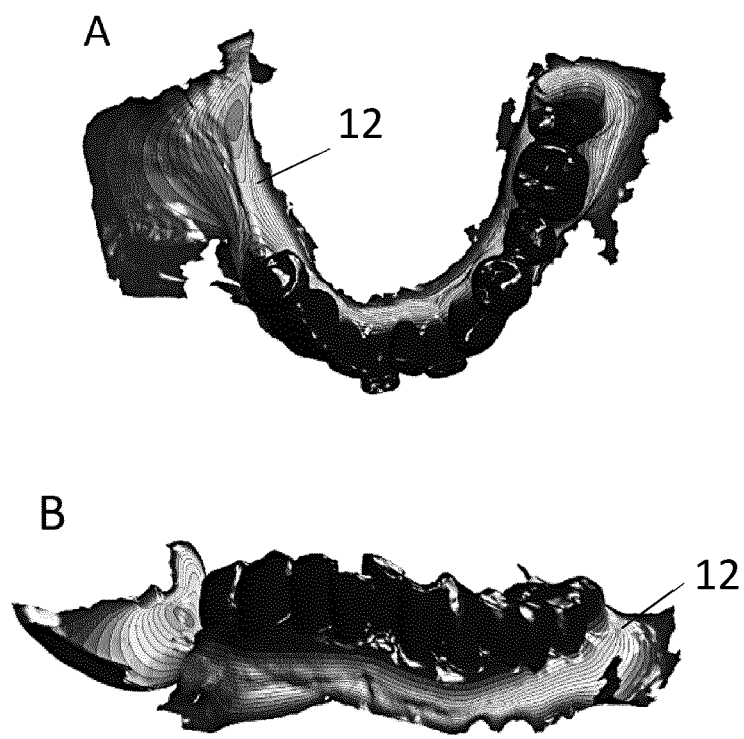
FIG. 9: Steady state solution of dissipative heat diffusion applied to an intraoral surface mesh. Twenty isolines are visualized.

In FIG. 9, a top and front view of a steady state solution with 20 isolines is visualized, resulting in S=19 regions between two isolines. Typically, the isolines in the outer boundary region are more spaced with respect to each other given that faster heat transfer in the concave flap regions as result of the local low heat dissipation (14). Isolines in the dental arch are also more spaced as this region is very cool (close to 0°) due to local high heat dissipation. The transition region where the concave flap region(s) border the convex dental arch region is characterised by more densely spaced temperature isolines. The isolines that may be suitable for determining a cut-off line for trimming the surface mesh are typically found within this region. To construct a temperature threshold function for automating the selection of a temperature isoline that can be used for defining a cut-off line, we first split the range $[u_{min}, u_{max}]$ into S intervals, for instance S equidistant intervals. This defines an ordered set of isolines $[\mathfrak{T}_0, \mathfrak{T}_1, \ldots, \mathfrak{T}_{S-1}, \mathfrak{T}_S]$ with temperatures $[u_0=u_{min} < \ldots < u_{S-1} < u_S=u_{max}]$, where S+1 is the number of isolines and S the number of regions between two consecutive isolines. The difference between the isoline temperatures is chosen to be equal:

$$u_S - u_{S-1} = \frac{1}{s}(u_{max} - u_{min}).$$

Figure 10:
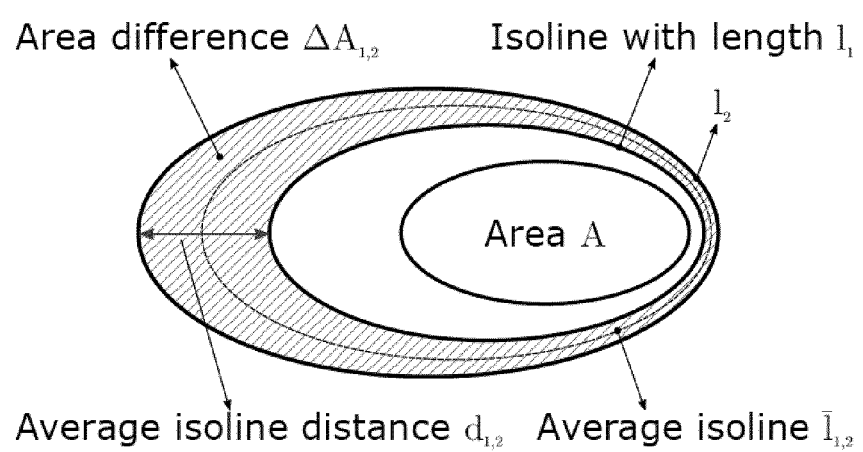
FIG. 10: Schematic illustration representing different temperature isoline variables determined and used in the automatic selection of an isoline enclosing a mesh region of interest.

The optimisation criteria of the threshold function were set as follows (see FIG. 10):

The average distance between the selected isoline and its neighbours is minimized. This average isoline distance d can be defined as follows:

$$d_{S-1,S} = \Delta A_{S-1,S} / \bar{l}_{S-1,S},$$

with $\Delta A_{S-1,S} = A_S - A_{S-1}$ the surface area between two consecutive isolines, and $\bar{l}_{S-1,S} = \frac{1}{2}(l_{S-1}+l_S)$ the average length of these two isolines. Note that $A_S$ and $\Delta A_{S-1,S}$ are preferably calculated based on triangle surface areas and not based on vertex Voronoi areas.

The total surface area $A_S$ within the selected isoline should be maximized. This makes sure thresholding will not occur at an isoline at low temperatures due to a small bulge in the surface.

The total smoothed mean curvature within the area enclosed by the selected isoline should be maximized. This ensures that the surface within the isoline is as convex as possible and the transition region between the concave flap regions and the convex dental arch region is targeted. Total smoothed mean curvature $\bar{\kappa}_s$ within isoline s can be defined as:

$$\bar{\kappa}_s = \Sigma_{v_i \in I} \bar{\kappa}_i \text{ with } u(v_i) \le u_s, \tag{19}$$

Figure 11:
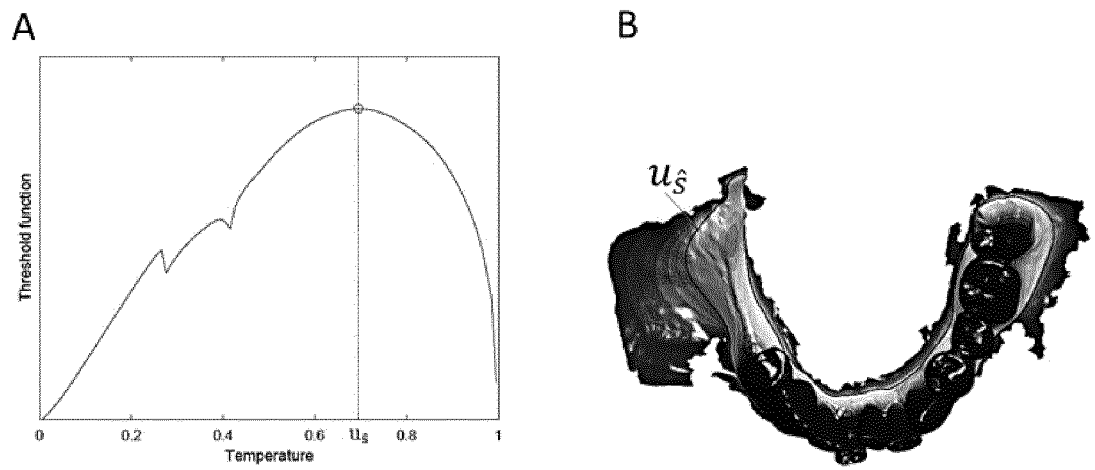
FIG. 11: Example of (A) the temperature threshold calculated using equation (20) and (B) the corresponding selected isoline $u_s$ indicated on the intraoral surface mesh.

The proposed temperature threshold function for selecting the isoline ŝ to be used for defining the cut-off line can then be determined as follows:

$$\hat{s} = \underset{s}{\operatorname{argmax}} \frac{\bar{l}_{S-1,S}}{\Delta A_{S-1,S}} A_S \kappa_S, \tag{20}$$

with corresponding temperature $u_\hat{s}$. An example of this temperature threshold function applied to a surface mesh representing the intraoral scan of FIG. 9 is shown in FIG. 11. The selected isoline index ŝ in this figure is 70 out of 100, while the its temperature is $u_\hat{s}$=0.695°.

5. Post-Processing

Figure 12:
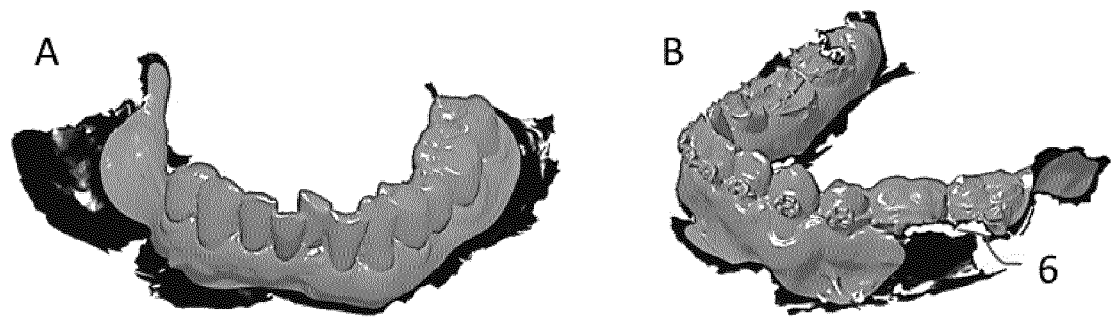
FIG. 12: Example of intraoral surface meshes that may benefit from a post-processing step as described in Section 5.

The curvature-based heat diffusion and the automatic isoline selection as described in Section 4, generally provided a selected isoline that is suitable to be used as a cut-off line for trimming the intraoral mesh. For instance, the isoline that was selected for the intraoral mesh shown in FIG. 11b provided a smooth cut-off line, which preserved the tooth surfaces along the dental arch. However, for certain intraoral surface meshes it was observed that the automatically selected isoline did not fully meet the requirements for a most suitable trimming. For instance, with an intraoral surface mesh of which a segment of the outer boundary comprised large flap regions, while another outer boundary segment was relatively smooth without protruding sections, the presence of the large flap regions caused the temperature of the automatically selected isoline to be rather low. The use of this isoline as cut-off line led in such cases to excessive trimming of the mesh along said smooth segments of the original outer boundary (as shown in FIG. 12a). Other intraoral surface meshes comprised so-called cracks resulting from incomplete data capturing during the scanning process causing the outer boundary to bend into the teeth area of the intraoral surface, typically into a molar area. When trimming such intraoral mesh using a cut-off line corresponding to an isoline selected as previously described, caused that part of the tooth bordering the in-bending outer boundary to be trimmed off (as shown in FIG. 12b).

Figure 13:
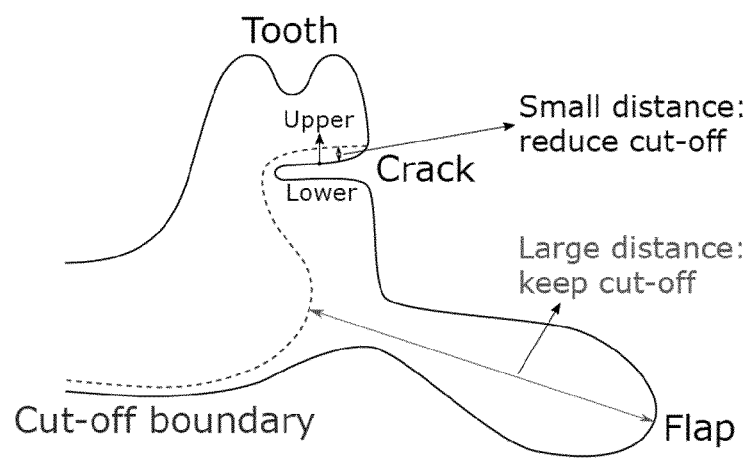
FIG. 13: Schematic illustration of the shortest distances between a selected isoline and vertices of an outer boundary segments delineating a flap region and a crack, respectively.

It was found that in the above-mentioned cases a more suitable cut-off line could be defined in a post-processing step, which involved using the selected isoline. Interestingly, the shortest distance between an outer boundary vertex and the selected isoline allows assessing whether an outer boundary vertex is more likely to be within a flap region or a region of interest (e.g. a dental area). This is schematically visualized in FIG. 13. The smaller this distance, the more likely the outer boundary vertex is not part of an outer boundary segment delineating a flap region. The larger this distance, the more likely the outer boundary vertex is part of a segment delineating a flap region. This information can be used to define a cut-off line. Essentially, the position of this cut-off line is set to correspond to that of the selected isoline where this isoline is alongside a flap region, while it is positioned closer to the outer boundary than this isoline within other surface mesh regions. Two post-processing approaches were developed, a distance-base approach and an approach involving the identification of the outer boundary segments delineating cracks. Both these approaches use an isoline selected as described in Section 4 for defining the cut-off line.

5.1. Defining the Cut-Off Line Using a Distance-Based Approach

The distance-based approach involves reapplying a heat diffusion function (14) on the mesh surface, wherein the boundary conditions are adjusted such that the temperature of each outer boundary vertex is fixed depending on the shortest Euclidean distance between the outer boundary vertex and a vertex of the selected isoline. So, in a first step the distance-based approach involves determining the vertices of the selected isoline. Thereafter, the temperatures of the outer boundary vertices are set in relation to said shortest Euclidean distances and the diffusion function is solved using the adjusted boundary conditions.

5.1.1. Determining the Vertices of the Selected Isoline

Given a mesh with a steady state temperature profile and a selected isoline with a temperature $u_\hat{s}$, each triangle in the mesh $\mathcal{T}_{ijk}$ with vertices $(v_i, v_j, v_k)$ and temperatures $u(v_i) \le u(v_j) \le u(v_k)$ can be assigned to one of three categories:

the triangles of which all three vertices have a temperature below $u_\hat{s}$ (triangles that would be kept when using the selected isoline as cut-off line), the triangles of which all three vertices have a temperature above $u_\hat{s}$ (triangles that would be trimmed off when using the selected isoline as cut-off line), and triangles of which a vertex has a temperature above and another vertex has a temperature below $u_\hat{s}$ (triangles that would be cut when using the selected isoline as cut-off line).

The triangles within this last category, can be divided in two further categories:

triangles of which one vertex is below $u_\hat{s}$ (FIG. 14(*a*))

triangles of which two vertices are below $u_\hat{s}$ (FIG. 14(*b*))

Figure 14:
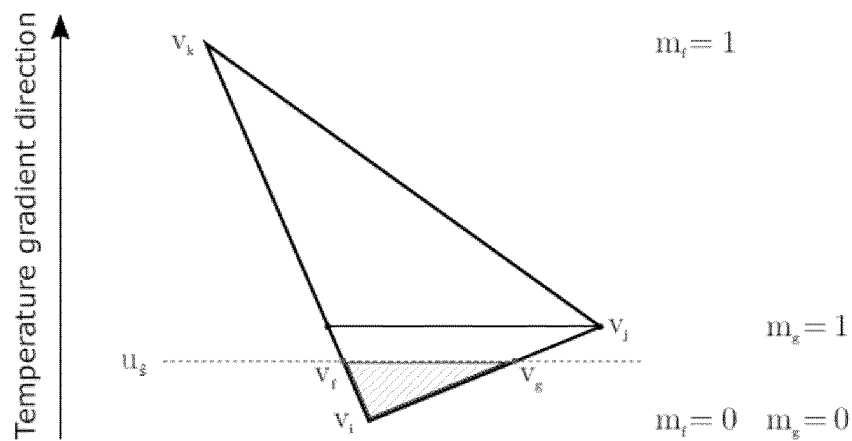
FIG. 14: Schematic representation of possible intersections between a selected isoline or cut-off line and a triangle of a surface mesh.
Figure 14:
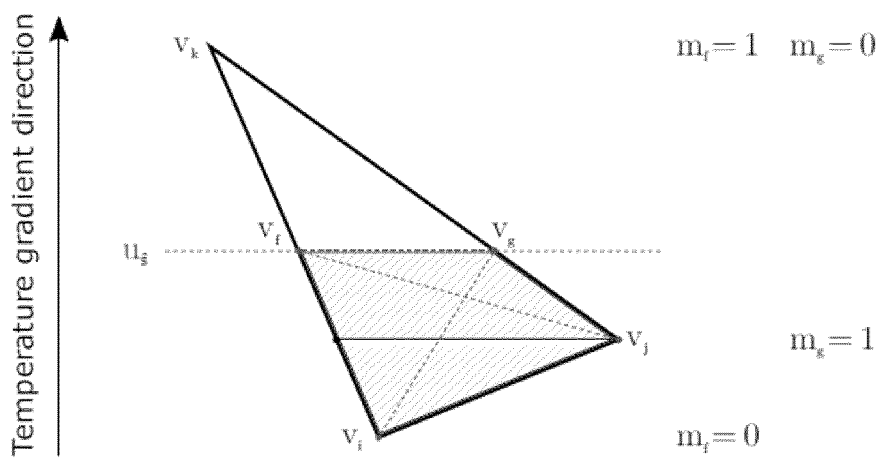

First and with reference to FIG. 14, for both latter categories, a new vertex $v_f$ is calculated:

$$m_f = \frac{u_{\tilde{s}} - u(v_i)}{u(v_k) - u(v_i)} \text{ with:} \tag{27}$$

$$u(v_i) \leq u(v_j) \leq u(v_k)$$

$$v_f = (1 - m_f)v_i + m_f v_k.$$

When only one vertex has a temperature below $u_{\tilde{s}}$ ($u(v_i) < u_{\tilde{s}}$ and $u(v_j) > u_{\tilde{s}}$), $v_g$ is found as follows (see FIG. 14a):

$$m_g = \frac{u_{\tilde{s}} - u(v_i)}{u(v_j) - u(v_i)} \tag{28}$$

$$v_g = (1 - m_g)v_i + m_g v_j.$$

When two vertices have a temperature below $u_{\tilde{s}}$ ($u(v_i) < u_{\tilde{s}}$ and $u(v_j) < u_{\tilde{s}}$), $v_g$ is found as follows (see FIG. 14b):

$$m_g = \frac{u_{\tilde{s}} - u(v_k)}{u(v_j) - u(v_k)} \tag{28}$$

$$v_g = (1 - m_g)v_k + m_g v_j.$$

5.1.2. Adjusting the Temperatures of the Outer Boundary Vertices and Defining the Cut-Off Line Given the temperature $u_{\tilde{s}}$ (20) of the selected isoline, we can adjust the outer boundary vertex temperatures $u(v_B)$ to for instance a value between $u_{\tilde{s}}$ and 1 (or higher), depending on the shortest Euclidean distances between each of said outer boundary vertices and vertices of the selected isoline. Practically, the temperature for each outer boundary vertex i was set using the following function:

$$d_B = \min_{u_j \in V_{\tilde{s}}} \|v_B - v_j\| \tag{25}$$

$$u(v_B) = u_{\tilde{s}} + u_{margin} + (1^\circ - u_{\tilde{s}} - u_{margin})\frac{d_B - d_{min}}{d_{max} - d_{min}},$$

with $V_{\tilde{s}}$ the vertices of the selected isoline, $u_{margin}$ a margin added to the temperature $u_{\tilde{s}}$ of the selected isoline (here set to about 0.05°), $d_{min}$ the first percentile shortest distances between outer boundary and selected isoline vertices and $d_{max}$ the shortest distance between a selected isoline vertex and an outer boundary vertex above which the outer boundary vertex is considered to delineate a flap region (here set to $d_{min}$+3 mm). For outer boundary vertices delineating flap regions, $u(v_B)=1$ or higher (25), i.e. equal to or above the original boundary conditions (16). As a result, the position of newly calculated isolines will not be significantly changed along flap regions. For outer boundary vertices that are within outer boundary segments that do no delineate a flap region or that are delineating a crack $d_B$ is relatively small, resulting in an $u(v_B)$ value between $u_{\tilde{s}}$ and 1°. As a result, the second heat diffusion will locally shift the new isolines more towards outer boundary segments comprising vertices with an $u(v_B)$ value below 1. From the newly calculated isolines the isoline with temperature $u_{\tilde{s}}$ can be selected as eventual cut-off line.

5.2. Defining the Cut-Off Line with Detection of the Cracks

The method of Section 5.1 generally provides an acceptable cut-off line for trimming an intraoral surface mesh. However, in case an intraoral mesh comprises prominent cracks in a tooth or teeth region it may be advantageous to use a method involving the identification of the outer boundary segments delineating cracks, which typically are elongated and thin inlets in the mesh surface delineated by a segment of the outer boundary. This characteristic can be exploited in a post-processing step comprising detecting outer boundary segments delineating cracks and subsequently defining a cut-off line, which avoids trimming off mesh regions bordering cracks. This post-processing step involves (re-)applying a heat diffusion function using adjusted boundary conditions.

Figure 15:
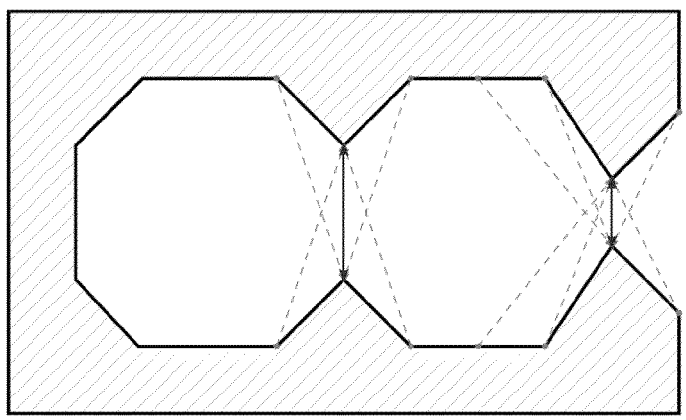
FIG. 15: Schematic representation of an outer boundary mesh segment delineating a crack. Dashed unidirectional arrows indicate for a given vertex the neighbouring vertex with the highest ratio of boundary geodesic distance over Euclidean distance. The full bidirectional arrows indicate the outer boundary vertices that have each other as neighbouring vertex with the highest ratio of boundary geodesic distance over Euclidean distance. Such vertices provide a candidate pair of entrance vertices. The candidate entrance pair on the left will not be retained as an entrance pair because the outer boundary vertices enclosed by this pair form a subset of the candidate entrance pair on the right.

The elongated nature of cracks can be used to assess whether an outer boundary vertex is within a segment delineating a crack by calculating a weight $\omega_{Bi}$ for each outer boundary vertex $v_{Bi}$ as the maximum ratio between the distance along the outer boundary and the Euclidean distance to the other boundary vertices in a neighbourhood around each boundary vertex:

$$\omega_{Bi} = \max_{Bj} \frac{\|v_{Bi} - v_{Bj}\|_g}{\|v_{Bi} - v_{Bj}\|_2}, \tag{26}$$

where $\|\cdot\|_g$ is the geodesic distance along the boundary and $\|\cdot\|_2$ is the Euclidean distance. For vertices in outer boundary segments delineating protruding flap regions or cracks this ratio ($\omega_{Bi}$) will be relatively high compared to outer boundary vertices in other segments. Especially, near the starting positions/entrances of flap regions and cracks $\omega_{Bi}$ will be high (see FIGS. 13, 15). To further restrict the types of cracks and protruding flap regions that are detected, constraints can be imposed. In this particular example the following constraints were used:

- a spherical neighbourhood around each boundary vertex with an Euclidean distance radius of 3 mm was used
- The geodesic distance along the boundary $\|v_{Bi}-v_{Bj}\|_g$ is limited to a range of [25 mm, 60 mm]. This avoids the detection of both too small and too large flap regions or cracks.
- the ratio $\omega_{Bi}$ should be larger than a certain value (set to 10). This restriction enforces a certain minimum elongation of the crack.

Using (26) combined with the above constraints provides a list of outer boundary vertices, which are within outer boundary segments delineating cracks or flap regions. However, no information is obtained on the individual crack or flap region delineating segments. Hereto pairs of vertices are identified, each pair defining the entrances or starting points of a crack or flap region. For each of the outer boundary vertices within said list both the maximum ration $\omega_{Bi}$ and the corresponding vertex $v_{Bj}$ are stored. When two listed outer boundary vertices are referencing each other, they are stored as a candidate entrance pair. Thereafter, the candidate entrance pairs are compared and if the outer boundary vertices in between a first candidate entrance pair are a subset of the ones in between a second candidate entrance pair, the first candidate entrance pair is removed. This eventually provides a list of entrance pairs, each pair defining an outer boundary segment delineating a crack or flap region. The method for defining the entrance pairs is visualized in FIG. 15 for a crack delineating an outer boundary segment. In a final step the crack detection comprises distinguishing the entrance pairs that define outer boundary segments delineating a crack from those delineating flap regions. This is done by determining the shortest Euclidean distances between each of the outer boundary vertices of a segment defined by a said entrance pair and the vertices of the selected isoline (see 5.1.1). In case for one of said outer boundary vertices this shortest distance exceeds a threshold value $d_{max}$ (here set at 3 mm), said entrance pair is considered to define an outer boundary segment delineating a flap region, otherwise said entrance pair is considered to define an outer boundary segment delineating a crack.

Once the outer boundary segments delineating cracks are identified, the heat diffusion function (14) can be solved again on said mesh using adjusted boundary conditions. In a first option, the temperature of the boundary vertices within an outer boundary segment delineating a crack is fixed to $u_s+u_{margin}$. This ensures that a newly calculated isoline with a temperature $u_s$ will be closer to the crack boundary than the initially selected isoline.

The second option is not to fix temperatures for outer boundary vertices within a crack delineating segment when setting the boundary conditions for the second heat transfer. This option typically provides even more protection and causes most of the crack outer boundary vertices to be included in the eventually trimmed mesh. A comparison of the three post-processing options as compared to the use of the initially selected isoline is shown in FIG. 16.

6. Trimming the Mesh

In a last step the mesh is cut along the defined cut-off line. In an initial step the vertices of the said cut-off line need to be determined. This can be done in the same way as described for the selected isoline, see Section 5.1.1 and FIG. 14. Once the vertices $v_f$ and $v_g$ of the cut-off line are found, new triangles are constructed where the cut-off line cuts through an original triangle. For a triangle of which only one vertex is below cut-off line temperature ($u_s$) (FIG. 14(a)) a new triangle $\mathcal{T}_{igf}$ is constructed. For a triangle of which two vertices are below $u_s$ (FIG. 14(b)) two triangles are constructed. These can either be $\mathcal{T}_{ijg}$ and $\mathcal{T}_{igf}$ or $\mathcal{T}_{ijf}$ or $\mathcal{T}_{jgf}$.

7. Specifying Conditions for Inner Mesh Regions

Optionally, the user can exclude or include certain regions of an intraoral surface mesh after having viewed a trimming solution as proposed according to the method of the present invention. In this example this is done by indicating vertices within selected mesh regions as heat sinks or heat sources. Indicating these vertices is done by marking a mesh region on a displayed representation of the intraoral surface mesh as a heat source or sink region. Following this marking the cut-off line can be re-estimated by applying following heat diffusion equation on the surface mesh or on the parts of the mesh comprising the selected regions and their surroundings:

$$\frac{\partial u(v,t)}{\partial t} = \alpha \nabla^2 u(v,t) - \lambda u(v,t) + F(v) = 0, \quad (30)$$

where F is a force term which should be positive for heat source inner vertices, negative for heat sink inner vertices and zero for other inner vertices. The magnitude of F can be adjusted determining the region of influence of the heat source/sink. This equation can be solved in a same way as discussed in section 2.1. To limit the required computing time and considering that the effects of a heat sink or source defined by a force term are typically limited to its nearby surroundings, it may be sufficient to locally solve (30) within an area comprising the selected region and a neighbouring area. This local area can be determined by starting with a list containing only the source/sink vertices, and iteratively adding to this list the 1-ring vertices of the vertices in this list, until a predetermined Voronoi area has been covered. An example of a heat source and heat sink applied to a toy example and an intraoral surface mesh is presented in FIG. 17.

8. Further Embodiments and Considerations

Figure 18:
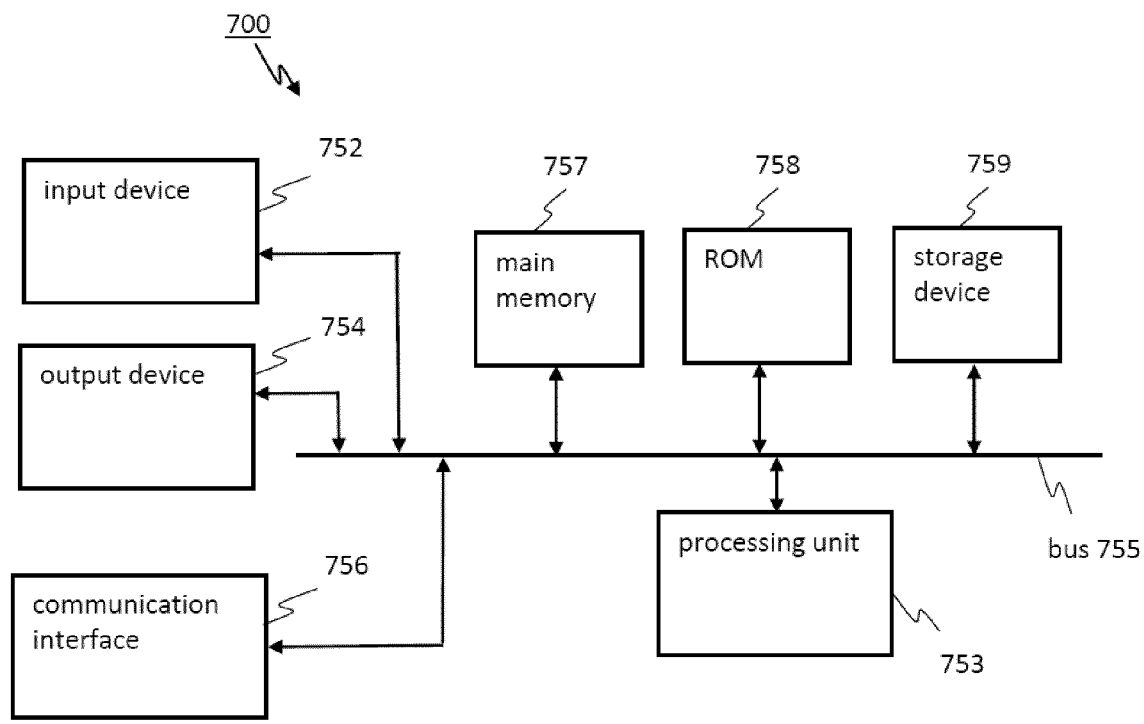
FIG. 18: Schematic diagram of an exemplary implementation of a system according to one embodiment of the invention.

FIG. 18 is a schematic diagram of an exemplary implementation of a system 700 that may be used in embodiments of the invention.

Figure 17:
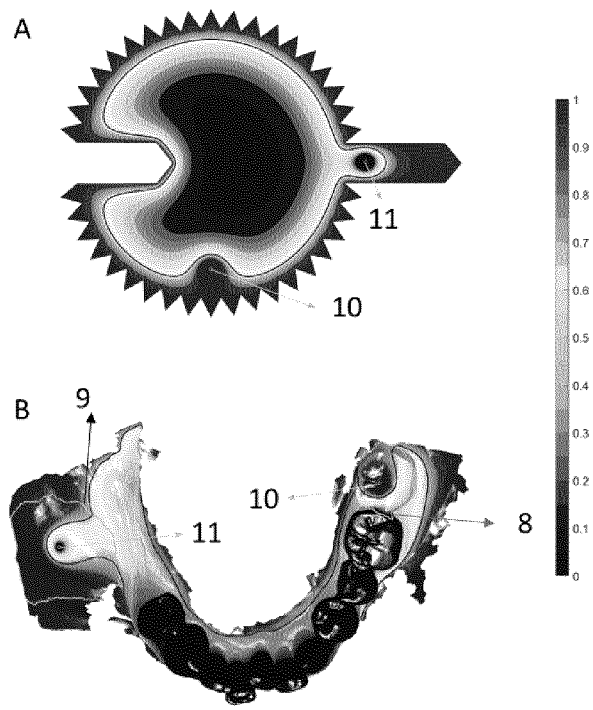
FIG. 17: Heat diffusion applied to (a) a toy surface mesh and (b) and an intraoral scan with one heat source and one heat sink: (7) indicates the newly found cut-off line, (8) and (9) respectively indicate the lines delineating the local areas surrounding the heat source (10) and sink (11) on which the heat diffusion equation is reapplied.

As illustrated by FIG. 17, system 700 may include a bus 755, a processing unit 753, a main memory 757, a ROM 758, a storage device 759, an input device 752, an output device 754, and a communication interface 756. Bus 755 may include a path that permits communication among the components of system 700.

Processing unit 753 may include a processor, a microprocessor, or processing logic that may interpret and execute instructions. Main memory 757 may include a RAM or another type of dynamic storage device that may store information and instructions for execution by processing unit 753. ROM 758 may include a ROM device or another type of static storage device that may store static information and instructions for use by processing unit 753. Storage device 759 may include a magnetic and/or optical recording medium and its corresponding drive.

Input device 752 may include a mechanism that permits a user to input information to system 700, such as a keypad, a keyboard, a mouse, a pen, voice recognition and/or biometric mechanisms, etc. Output device 754 may include a mechanism that outputs information to the user, including a display, a printer, a speaker, etc. Communication interface 756 may include any transceiver-like mechanism, or receiver and transmitter, that enables system 700 to communicate with other devices and/or systems (such as with an imaging apparatus as mentioned above, etc.). For example, communication interface 756 may include mechanisms for communicating with another device or system via a telecommunication network.

System 700 may perform certain operations or processes described herein. These operations may be performed in response to processing unit 753 executing software instructions contained in a computer-readable medium, such as main memory 757, ROM 758, and/or storage device 759. A computer-readable medium may be defined as a physical or a logical memory device. For example, a logical memory device may include memory space within a single physical memory device or distributed across multiple physical memory devices. Each of main memory 757, ROM 758 and storage device 759 may include computer-readable media. The magnetic and/or optical recording media (e.g., readable CDs or DVDs) of storage device 759 may also include computer-readable media. The software instructions may be read into main memory 757 from another computer-readable medium, such as storage device 759, or from another device via communication interface 756.

The software instructions contained in main memory 759 may cause processing unit 753 to perform operations or processes described herein, such as above-described steps 100, 200, 300, and 400. Alternatively, hardwired circuitry may be used in place of or in combination with software instructions to implement processes and/or operations described herein. Thus, implementations described herein are not limited to any specific combination of hardware and software.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

REFERENCES

BISWAIJT BOSE: "Detecting Open Surfaces in Three Dimension", thesis submitted to the Department of Electrical Engineering and Computer Science in partial fulfillment of the requirements for the degree of doctor of philosophy in electrical engineering and computer science, 1 Jun. 2009, p. 1-104.

The invention claimed is:

1. A method of trimming an open surface mesh, which comprises an inner mesh region delineated by an outer boundary, said method comprising:
receiving said open surface mesh;
determining a cut-off line for trimming said open surface mesh wherein said determining comprises
computing function values for a plurality of positions on said open surface mesh by solving a diffusion function describing an evolution in time of the spatial distribution of a quantity over said open surface mesh, said diffusion function being characterized by an equation of type $$\frac{\partial f(v, t)}{\partial t} = \nabla \cdot A \nabla f(v, t)$$

and applying boundary conditions specifying function values of a solution of said equation along said outer boundary, wherein v is a spatial position, t is time, $\nabla \cdot$ is a divergence operator, A is a positive definite matrix, $\nabla$ is a gradient operator and $f$ is a function defined on said open surface mesh;
calculating one or more isolines from said function values, each such isoline joining surface mesh positions with the same function value,
selecting from said one or more isolines an isoline enclosing a region of interest of said open surface mesh; and
using the selected isoline as a cut-off line enclosing a surface mesh region to be maintained after trimming or using the selected isoline as a reference in post-processing for defining a cut-off line wherein a trajectory of said cut-off line is situated between said selected isoline and the outer boundary of said open surface mesh; and
trimming said open surface mesh by removing the surface mesh regions between said cut-off line and the outer boundary of said open surface mesh.

2. The method according to claim 1, wherein said diffusion function comprises an independent variable that is a measure of a local surface mesh property selected from a measure for the distance between a mesh position and the outer boundary, a measure indicative of a surface curvature at a mesh position or a measure indicative of a color at a mesh position.

3. The method according to claim 1, wherein computing said function values comprises calculating a steady state solution for said diffusion function.

4. The method according to claim 1, wherein computing said function values comprises calculating a non-uniform intermediary solution of said function.

5. The method according to claim 1, wherein said diffusion function is a heat diffusion function with an equation of a type $$\frac{\partial u(v, t)}{\partial t} = \alpha \nabla^2 u(v, t),$$

wherein $\alpha \nabla^2 u(v, t)$ specifies a thermal diffusion term with $\alpha$ being a heat diffusion coefficient (with units meters$^2$ per second) describing a virtual rate of heat transfer over said mesh and $\nabla^2 u$ denoting the Laplace-Beltrami operator applied to the function u and wherein u(v, t) returns a virtual temperature.

6. The method according to claim 5, wherein said heat equation further comprises a heat dissipation term $-\lambda$ u(v, t) providing an equation $$\frac{\partial u(v, t)}{\partial t} = \alpha \nabla^2 u(v, t) - \lambda u(v, t),$$

with $\lambda$ denoting a heat dissipation coefficient (s$^{-1}$), wherein $\lambda \geq 0$.

7. The method according to claim 6, wherein the heat diffusion coefficient ($\alpha$) and/or the heat dissipation coefficient ($\lambda$) are dependent on a measure indicative of a surface curvature at a mesh position, a measure indicative of a color at a mesh position or a measure for a distance between a mesh position and the outer boundary.

8. The method according to claim 7, wherein the heat diffusion coefficient ($\alpha$) and/or the heat dissipation coefficient ($\lambda$) are dependent on a mean surface curvature or on a smoothed mean surface curvature as determined for a vertex position.

9. The method according to claim 5, comprising the calculation of a plurality of uniformly-spaced isolines by dividing a range between a calculated lowest ($u_{min}$) and highest ($u_{max}$) virtual temperature into S equidistant intervals thus defining an ordered set of S+1 isolines wherein a difference between isoline values of two neighbouring isolines is $$\frac{1}{S}(u_{max} - u_{min}).$$

10. The method according to claim 9, wherein identifying an open surface mesh region of interest comprises selecting one of said uniformly-spaced isolines as the isoline enclosing a region of interest based on following criteria (i) minimal average distance between the selected isoline and its neighboring isolines, (ii) maximal total surface area within the selected isoline and (iii) maximal total mean or smoothed mean curvature within the selected isoline.

11. The method according to claim 1, wherein the selected isoline enclosing a surface mesh region of interest is identified as the cut-off line.

12. The method according to claim 1, wherein the cut-off line is identified in post-processing using the selected isoline as a reference for identifying said cut-off line, wherein relative to the selected isoline said cut-off line is moved towards the outer boundary at positions where a shortest distance between the selected isoline and the outer boundary is below a threshold value and wherein said cut-off line is substantially maintained at the level of the selected isoline at positions where the minimal distance between the selected isoline and the outer boundary exceeds said threshold value.

13. The method according to claim 12, wherein said post-processing comprises:
recomputing function values for a plurality of positions on said open surface mesh by applying on said mesh a diffusion function using adapted boundary conditions;
calculating one or more new isolines from said recomputed function values;
from said new isolines selecting an isoline enclosing a region of interest of said open surface mesh; and
defining a cut-off line enclosing the surface mesh region to be maintained after trimming using the selected isoline from said new isolines;
wherein said adapted boundary conditions favor a solution wherein as compared to the initial isolines the positions of the new isolines (i) shift towards the outer boundary where the smallest distance between the said initially selected isoline and the outer boundary is below a threshold distance, and (ii) are substantially maintained where this smallest distance exceeds said threshold distance.

14. The method according to claim 12, wherein said post-processing comprises a detection of boundary vertices of outer boundary segments that either bend into said open surface mesh and delineate cracks or that delineate protruding flap regions of said surface mesh,
wherein said detection comprises determining for each outer boundary vertex the distances along the outer boundary and the Euclidean distances between said outer boundary vertex and neighboring outer boundary vertices within a region surrounding said boundary vertex,
wherein said boundary vertex is detected as a boundary vertex of an in-bending or protruding outer boundary segment when the ratio of said geodesic distance over said Euclidean distance between a first boundary vertex and any one of said neighboring boundary vertices exceeds a threshold value.

15. The method according to claim 14, wherein pairs of entrance vertices defining start and end points of in-bending or protruding boundary segments are identified using a method comprising:
identifying for each said outer boundary vertex detected to be in an in-bending or protruding outer boundary segment the neighboring boundary vertex with the highest said ratio of boundary geodesic distance over Euclidean distance as the corresponding boundary vertex;
retaining the detected vertices that have each other as corresponding boundary vertices as candidate pairs of said entrance vertices;
comparing said retained pairs of candidate entrance vertices wherein a pair of candidate entrance vertices is discarded when the outer boundary vertices between said candidate entrance vertices are a subset of the outer boundary vertices between another pair of candidate entrance vertices; and
labelling the remaining pairs of said candidate entrance vertices as pairs of entrance vertices of in-bending or protruding boundary segments.

16. The method according to claim 15, wherein an outer boundary segment defined by a said pair of entrance vertices is labelled as an in-bending outer boundary segment in case all shortest distances between the respective vertices of said segment, including the entrance pair vertices, and the initially selected isoline are below a threshold distance.

17. The method according to claim 16, wherein said post-processing further comprises repositioning the selected isoline towards the in-bending boundary segments.

18. The method according to claim 17, wherein said post-processing comprises (i) computing new function values by re-applying a diffusion function over said open surface mesh using adapted boundary conditions along said in-bending or protruding outer boundary segments, (ii) re-calculating isolines from said new function values, (iii) selecting one of said re-calculated isolines selected as the isoline enclosing the region of interest and (iv) determining the cut-off line for trimming said open surface mesh using said selected re-calculated isoline.

19. The method according to claim 15, wherein an outer boundary segment defined by a said pair of entrance vertices is labelled as an outer boundary segment delineating a protruding flap region in case the shortest distance between at least one vertex of said segment, including the entrance pair vertices, and the initially selected isoline exceeds a threshold distance.

20. The method according to claim 1, wherein said open surface mesh is an intraoral surface mesh representing a part of the intraoral region.

21. The method according to claim 20, wherein said intraoral surface mesh comprises a convex dental arch and one or more concave mesh regions.

22. A method of planning an intraoral surgical intervention or of designing a dental prosthesis, the method comprising the method of trimming according to claim 20.

23. A method of trimming an open surface mesh, which comprises an inner mesh region delineated by an outer boundary, said method comprising:
receiving said open surface mesh;
determining a region of said open surface mesh to be maintained after trimming wherein said determining comprises:
computing function values for a plurality of positions on said open surface by solving a diffusion function describing an evolution in time of the spatial distribution of a quantity over said open surface mesh, said diffusion function being characterized by an equation of type $$\frac{\partial f(v,t)}{\partial t} = \nabla \cdot A \nabla f(v,t)$$

and applying boundary conditions specifying function values of a solution of said equation along said outer boundary, wherein v is a spatial position, t is time, $\nabla \cdot$ is a divergence operator, A is a positive definite matrix, $\nabla$ is a gradient operator and $f$ is a function defined on said open surface mesh, and identifying an open surface mesh region to be maintained after trimming wherein said region groups mesh positions with function values within a selected range; and trimming said open surface mesh by removing the open surface mesh regions outside the region identified to be maintained after trimming.

24. The method according to claim 23, wherein said diffusion function comprises a measure indicative of a local surface mesh property that is a measure for the distance between a mesh position and the outer boundary, a measure indicative of a surface curvature at a mesh position or a measure indicative of a color at a mesh position.

25. The method according to claim 23, wherein said diffusion function is a heat diffusion function.

26. A system of trimming an open surface mesh, which comprises an inner mesh region delineated by an outer boundary, said system comprising a processing unit configured to perform the method comprising:

receiving said open surface mesh;

determining a cut-off line for trimming said open surface mesh wherein said determining comprises:

computing function values for a plurality of positions on said open surface mesh by solving a diffusion function describing an evolution in time of the spatial distribution of a quantity over said open surface mesh, said diffusion function being characterized by an equation of type $$\frac{\partial f(v, t)}{\partial t} = \nabla \cdot A \nabla f(v, t)$$

and applying boundary conditions specifying function values of a solution of said equation along said outer boundary, wherein v is a spatial position, t is time, $\nabla \cdot$ is a divergence operator, A is a positive definite matrix, $\nabla$ is a gradient operator and $f$ is a function defined on said open surface mesh;

calculating one or more isolines from said function values, such isoline joining surface mesh positions with the same function value, selecting from said one or more isolines an isoline enclosing a region of interest of said open surface mesh; and using the selected isoline as a cut-off line enclosing a surface mesh region to be maintained after trimming or using the selected isoline as a reference in post-processing for defining a cut-off line wherein a trajectory of said cut-off line is situated between said selected isoline and the outer boundary of said open surface mesh; and trimming said open surface mesh by removing the surface mesh regions between said cut-off line and the outer boundary of said open surface mesh.

* * * * *